United States Patent [19]
Hockett

[11] Patent Number: 5,319,893
[45] Date of Patent: Jun. 14, 1994

[54] RECOVERY SYSTEM

[76] Inventor: Wayne B. Hockett, 1701 E. Sligh, Tampa, Fla. 33610

[21] Appl. No.: 973,833

[22] Filed: Nov. 9, 1992

Related U.S. Application Data

[63] Continuation-in-part of Ser. No. 827,019, Jan. 28, 1992, abandoned.

[51] Int. Cl.$^5$ ............................................. B24C 9/00
[52] U.S. Cl. ...................................... 51/424; 51/439; 51/410
[58] Field of Search ............... 51/410, 415, 424, 426, 51/427, 429, 439, 281 R, 317, 319

[56] References Cited

U.S. PATENT DOCUMENTS

| | | | |
|---|---|---|---|
| Re. 30,289 | 6/1980 | Hockett | 51/429 |
| 3,186,132 | 6/1965 | Duncan et al. | |
| 3,604,627 | 9/1971 | Miscovich | |
| 3,619,311 | 11/1971 | Rose | |
| 4,007,793 | 2/1977 | Hux et al. | |
| 4,027,433 | 6/1977 | Hockett | |
| 4,064,661 | 12/1977 | Maeda | |
| 4,095,378 | 6/1978 | Urakami | |
| 4,126,970 | 11/1978 | Hockett | |
| 4,139,970 | 2/1979 | Hockett | |
| 4,255,906 | 3/1981 | Hockett | |
| 4,305,344 | 12/1981 | Baskett | 51/429 |
| 4,333,277 | 6/1982 | Tasedan | 51/427 |
| 4,370,836 | 2/1983 | Hockett | |
| 4,375,740 | 3/1983 | Brown | |
| 4,646,480 | 3/1987 | Williams | |
| 4,646,482 | 3/1987 | Chitjian | 51/424 |
| 4,683,684 | 8/1987 | Yie | 51/410 |
| 4,825,598 | 5/1989 | Schlick | 51/426 |
| 4,984,397 | 1/1991 | Van Leeuwen | |
| 4,993,200 | 2/1991 | Morioka et al. | |
| 5,010,693 | 4/1991 | Hatch | 51/427 |
| 5,138,800 | 8/1992 | Janusz | 51/429 |

FOREIGN PATENT DOCUMENTS

| | | |
|---|---|---|
| 733188 | 3/1943 | Fed. Rep. of Germany . |
| 7615295 | 12/1976 | France . |
| 36865 | 3/1977 | Japan . |
| 7703359 | 3/1977 | Netherlands . |

Primary Examiner—Bruce M. Kisliuk
Assistant Examiner—Bo Bounkong

[57] ABSTRACT

An apparatus and method is disclosed for recovering a cleaning material and a surface material with a vacuum source. The surface material is removed from a surface by projecting the cleaning material such as sand, water or the like from a plurality of rotatable nozzle to impact upon the surface. The apparatus comprises a housing having a housing opening for projecting the cleaning material through the housing opening onto the surface. A fluid seal provides a seal between the housing and the surface. The vacuum source is connected to the housing for withdrawing the impacted cleaning material and the surface material removed from the surface.

13 Claims, 17 Drawing Sheets

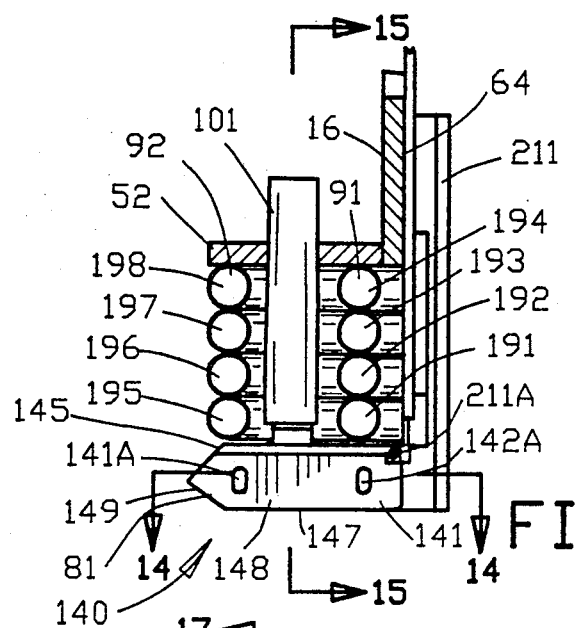
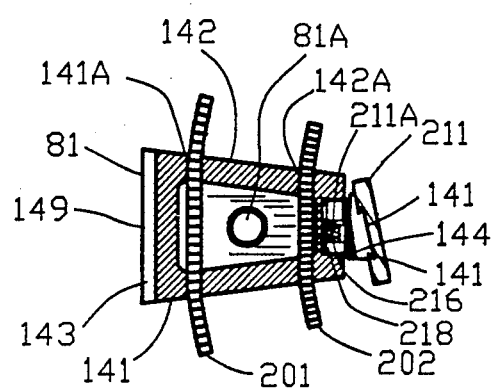
FIG. 13  FIG. 14
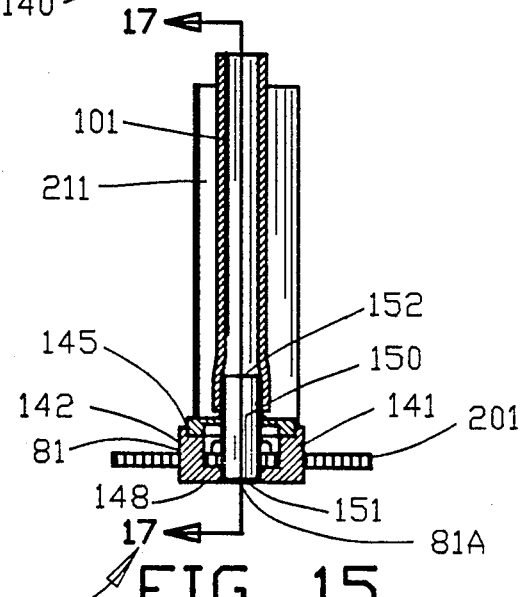
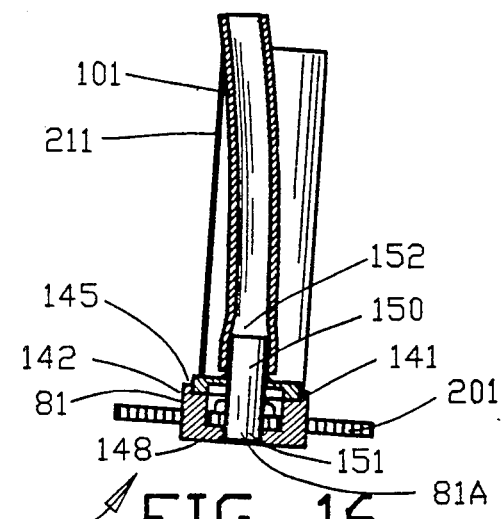
FIG. 15  FIG. 16
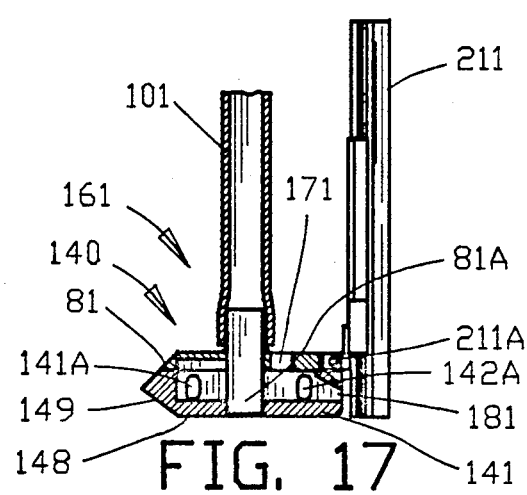
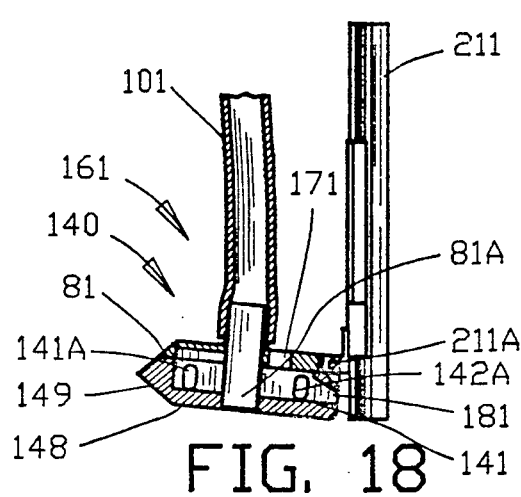
FIG. 17  FIG. 18

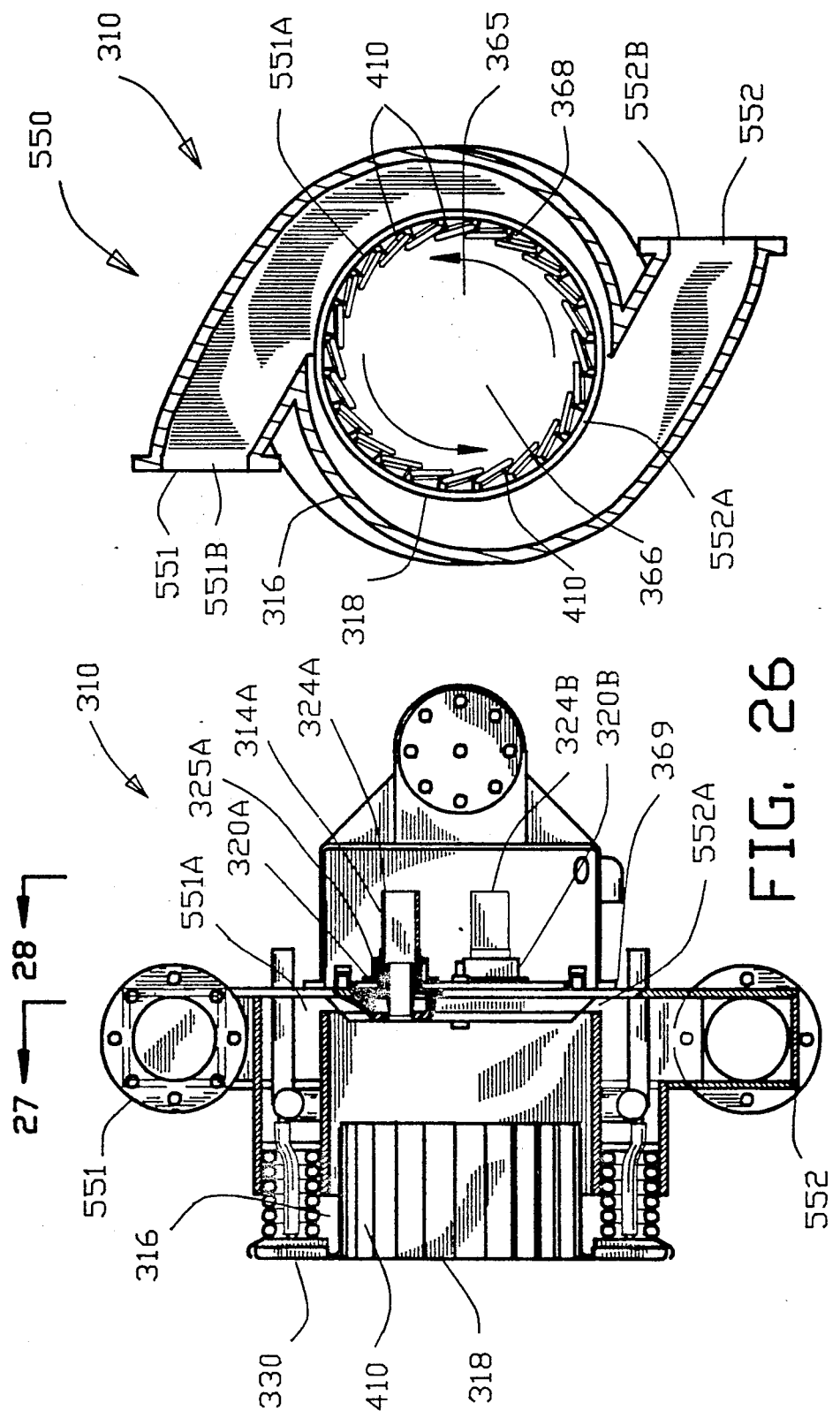

RECOVERY SYSTEM

This is a continuation-in-part of U.S. patent application Ser. No. 827,019 filed Jan. 28, 1992 now abandoned in the United States Patent and Trademark Office. All subject matter set forth in U.S. patent application Ser. No. 827,019 is hereby incorporated by reference into the present application as if fully set forth herein.

BACKGROUND OF THE INVENTION

1. Field Of The Invention

This invention relates to cleaning and recovery, and more particularly to an apparatus for cleaning a surface by projecting a cleaning material upon the surface and for recovering the impacted cleaning material and the material removed from the surface.

2. Background Of The Invention

The process cleaning of a surface by sand blasting, water blasting and the like has been well established in the prior art. Although these cleaning processes have progressed the art, the processes still require the projection of a cleaning material such as sand, water or another abrasive material to impact onto a surface. The force of the impact of the cleaning material abrades or cleans the surface thus removing any overcoating, contaminants, corrosion or the like.

Typically, the cleaning material is directed from a nozzle toward the surface by an operator physically holding the nozzle. The force of the cleaning material emanating from the nozzle makes the physical holding of the nozzle difficult for the operator. In addition, the force of the impact of the cleaning material on the surface results in the cleaning material and material removed from the surface such as over-coatings, contaminants, corrosion or the like being projected back from the surface. The cleaning material and the material removed from the surface are not only projected back toward the operator but are also dispersed within the surrounding atmosphere. It should be appreciated by those skilled in the art that such an operation is hazardous not only to the operator but is also hazardous to the environment.

In my prior patents including U.S. Pat. No. RE 30,289; 4,139,970 and 4,545,156, I replaced the physical holding of the of nozzle by an operator through the use of a nozzle holding apparatus. These U.S. patents not only eliminated the difficult task of physically holding the nozzle by an operator, but also enabled the use of multiple nozzles to increase the efficiency of the cleaning operation. In addition, since these U.S. Patents eliminated the need for the operator to physically hold the nozzle, the operator could be removed from the immediate area of the cleaning process. Accordingly, the hazard to the operator was substantially reduced through the practice of my prior inventions.

It is a prime object of the present invention to improve upon my prior inventions by providing a recovery system for totally collecting the impacted cleaning material and the material removed from the cleaned surface.

Another object of the present invention is to provide an improved apparatus for recovering a cleaning material and material removed from the surface that is safe for both the operator and the environment.

Another object of the present invention is to provide an improved apparatus for recovering a cleaning material and material removed from the surface that is a practical apparatus and method for such recovery.

Another object of this invention is to provide an improved apparatus for recovering a cleaning material and a material removed from the surface that has substantially total recovery.

Another object of this invention is to provide an improved apparatus for recovering a cleaning material and a material removed from the surface material that is adaptable to various pre-existing cleaning devices.

Another object of this invention is to provide an improved apparatus for recovering a cleaning material and a material removed from the surface material that is mountable on a pre-existing cleaning device for movement therewith.

Another object of this invention is to provide an improved apparatus for recovering a cleaning material and a material removed from the surface that is lightweight and durable.

Another object of this invention is to provide an improved apparatus for recovering a cleaning material and a material removed from the surface having a life expectancy commensurate with the life expectancy of blast nozzles.

Another object of this invention is to provide an improved apparatus for recovering a cleaning material and a material removed from the surface that is economical to manufacture and easy to replace.

Another object of this invention is to provide an improved apparatus for recovering a cleaning material and a material removed from a surface that recovers substantially all of the materials with a minimum vacuum source.

The foregoing has outlined some of the more pertinent objects of the present invention. These objects should be construed as being merely illustrative of some of the more prominent features and applications of the invention. Many other beneficial results can be obtained by applying the disclosed invention in a different manner or modifying the invention with in the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention relates to an improved apparatus for recovering a cleaning material and a surface material with a vacuum source. The surface material is removed from a surface by projecting the cleaning material from a nozzle to impact upon the surface. The apparatus comprises a housing having a housing opening with housing mounting means for mounting the housing relative to the nozzle enabling the nozzle to project the cleaning material through the housing opening to impact onto the surface. The nozzle includes a plurality of nozzles rotatably mounted within the housing. A fluid seal means is mounted for mounting the fluid seal means relative to the housing for providing a seal between the housing opening and the surface. A vacuum connection means connects the vacuum source to the housing for withdrawing the impacted cleaning material and the surface material removed from the surface from the housing.

In a more specific embodiment of the invention, first resilient means resiliently mounts the housing relative to the nozzle for adjusting the housing relative to the nozzle for varying the distance between the nozzle and the surface. A second resilient means for resiliently mounts the fluid seal means to the housing.

Preferably, the fluid seal means comprises a plurality of fluid seal elements being disposed proximate the housing opening. the fluid seal mounting means independently mount each of the plurality of fluid seal elements for enabling each of the plurality of fluid seal elements to be independently movable for sealing with a curved surface.

In one embodiment of the invention, vent means introduces ambient air into the housing for creating an air flow from the ambient into the housing for enabling the vacuum source to withdraw impacted cleaning material and the surface material from the housing. In one embodiment of the invention, a plurality of directional louvers communicating with the housing internal volume through the cylindrical sidewall to direct ambient air into the housing internal volume for creating the vortex within the housing for withdrawing the impacted cleaning material and the surface material from the housing. The vacuum connection means includes a plurality of angularly orientated vacuum ports for enhancing the vortex within the housing internal volume of the housing.

The invention is also incorporated into the method of recovering a cleaning material and a surface material with a vacuum source. The surface material is removed from a surface by projecting the cleaning material from a nozzle within a housing through a housing opening to impact upon the surface. The method comprises the steps of providing a fluid seal between the housing and the surface for providing a seal therebetween and connecting the vacuum source to the housing for recovering the impacted cleaning material and the surface material from the housing.

Preferably, the step of providing a fluid seal between the housing and the surface includes establishing a fluid flow between the housing and the surface and entering the housing opening for providing the fluid seal between the housing and the surface.

In one embodiment of the invention, a fluid flow is introduced into the housing sufficient for maintaining a desired fluid pressure in the housing. Preferably, a vortex of fluid flow is created within a peripheral region of the housing with the vacuum source for recovering the impacted cleaning material and the surface material from the housing.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which:

FIG. 13 is an enlarged view of a fluid seal shown in FIGS. 11 and 12;

FIG. 14 is a sectional view along line 14—14 in FIG. 13;

FIG. 15 is a sectional view along line 15—15 in FIG. 13;

FIG. 16 is a view similar to FIG. 15 illustrating the fluid seal in a pivoted position;

FIG. 17 is a sectional view along line 17—17 in FIG. 15;

FIG. 18 is a view similar to FIG. 17 illustrating the fluid seal in a rotated position;

FIG. 21 is a sectional view similar to FIG. 7 illustrating the fluid flow paths present during the operation of the apparatus;

FIG. 26 is a sectional view of the apparatus of FIG. 24;

FIG. 27 is a sectional view along line 27—27 in FIG. 26;

Similar reference characters refer to similar parts throughout the several Figures of the drawings.

DETAILED DISCUSSION

Figure 1:
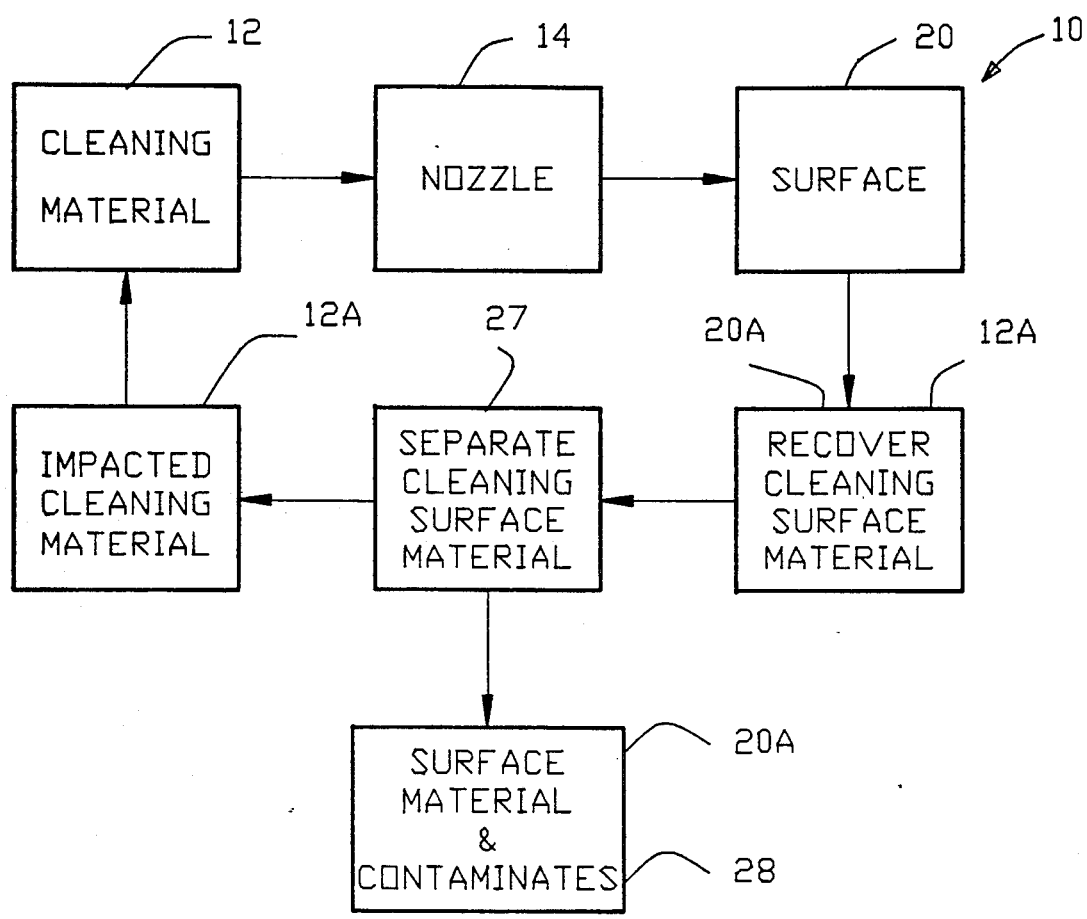
FIG. 1 is a block diagram of the process of the present invention.
Figure 2:
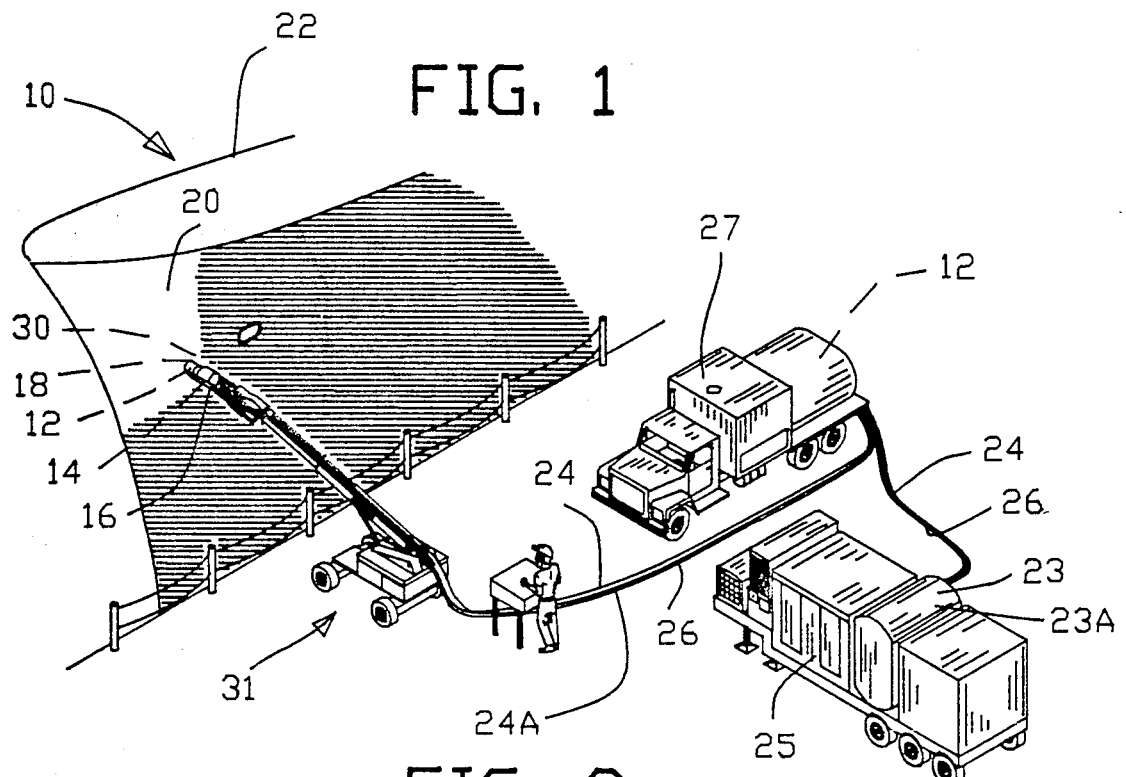
FIG. 2 is an isometric view of the apparatus of the present invention cleaning a ship and recovering cleaning material and surface material removed from a cleaned surface of the ship.
Figure 3:
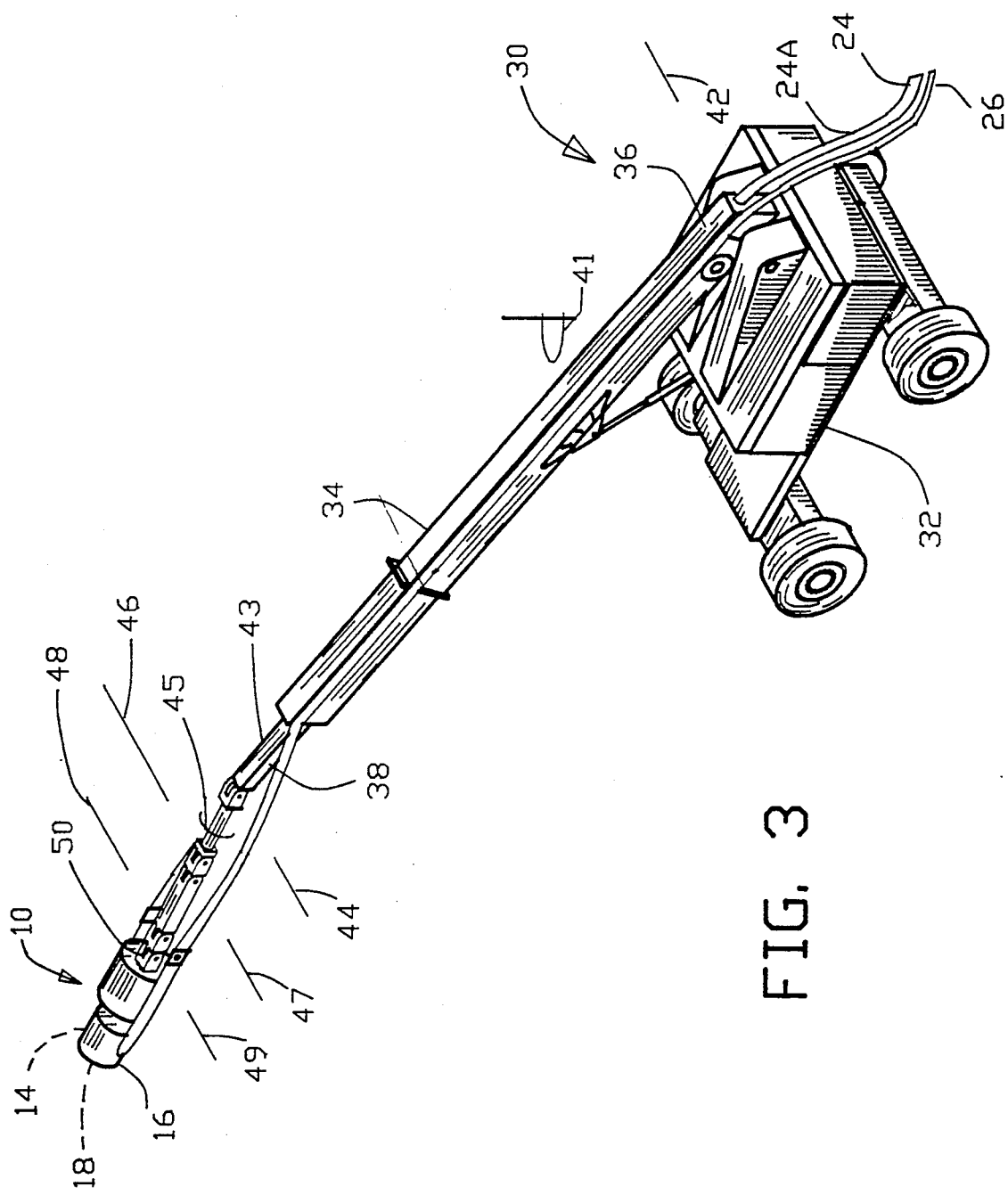
FIG. 3 is an enlarged view of a portion of FIG. 2 further illustrating the apparatus of the present invention.
Figure 4:
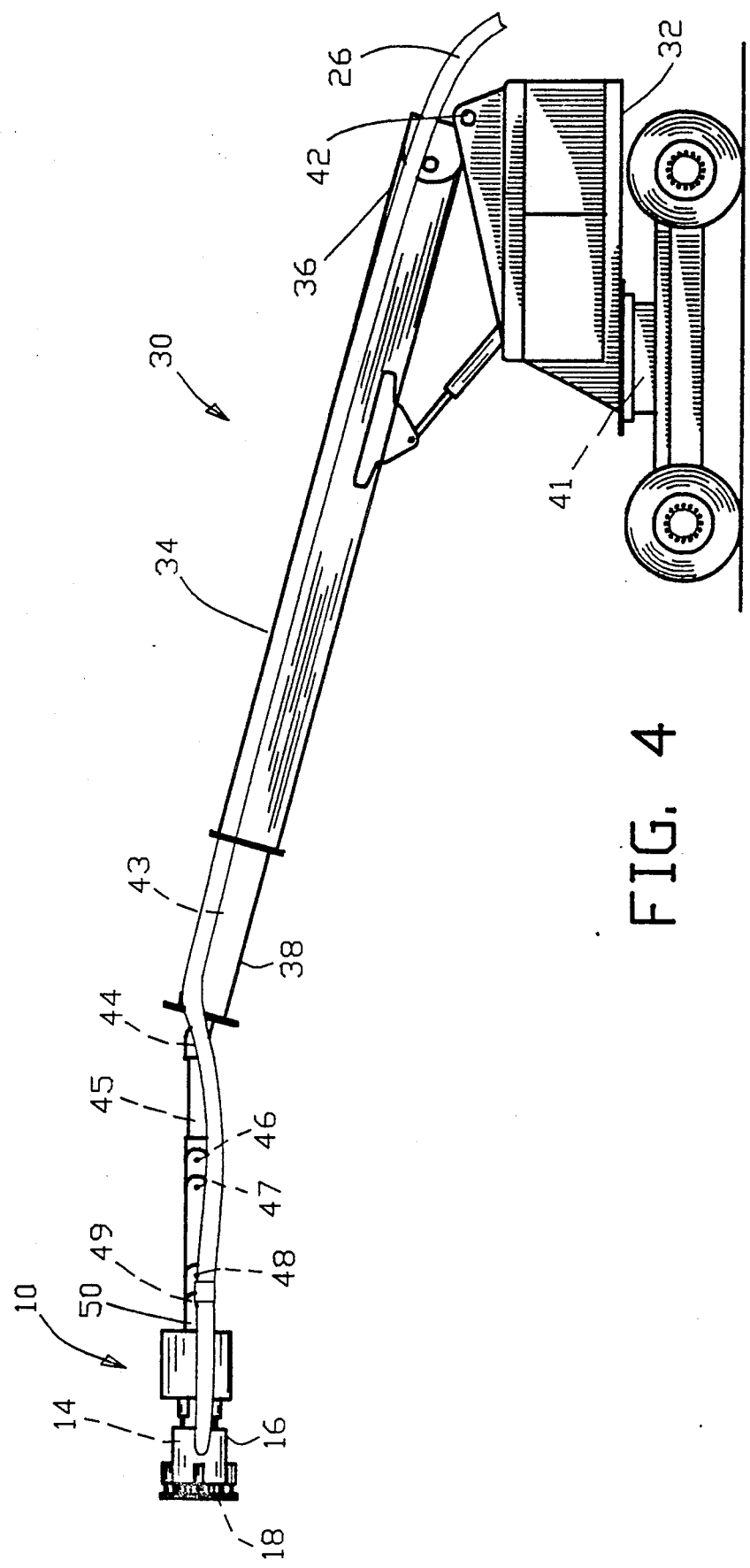
FIG. 4 is a side view of the apparatus of FIG. 3.

FIG. 1 is a block diagram of the process of the present invention with an example of the apparatus 10 of the invention being shown in FIGS. 2-4. The method of the present invention comprises projecting a cleaning material 12 such as an abrasive or other cleaning agent from a nozzle 14 disposed within a housing 16 through a housing opening 18 to impact upon a surface 20 shown as a ship 22 in FIG. 2. Preferably the cleaning material 12 is supplied to the nozzle 14 from a source of high pressure fluid 23 such as compressed air through hoses 24 in a conventional manner. The impacted cleaning material 12A and a surface material 20A which has been removed from the surface 20 are withdrawn from the housing 16 by a vacuum source 25 through hoses 26 to a separator 27. The separator 27 such as a cyclone separator or the like separates the impacted cleaning material 12A from the surface material 20A for enabling the impacted cleaning material 12A to be reused by the apparatus 10. The surface material 20A and any contaminants 28 therein can be disposed of in an environmentally safe manner. As will be described in greater detail hereinafter, the housing opening 18 is sealed by the surface 20 by a fluid seal means 30 provided by a source of low pressure fluid 23A through hoses 24A.

An example of the apparatus 10 of the invention is shown in FIGS. 2-4 as a sand blasting or water blasting device 31 constructed in accordance with my prior invention shown in U.S. Pat. No. 4,545,156. The blasting device 31 includes a mobile platform 32 supporting a boom 34 having a proximal end 36 and a distal end 38. The proximal end 36 of the boom 34 is rotationally mounted on the platform 32 along rotational axes 41 and 42, respectively. The boom 34 is telescopically movable along a linear axis 43 for extending and retracting the distal end 38 thereof. The nozzle 14 is fixed to a nozzle support 50 which is rotationally mounted to the distal end 38 of the boom 34 along rotational axes 44-49. The movement of the nozzle support 50 along axes 41-49 provides sufficient freedom of movement for allowing the movement of the nozzle 14 to be controlled by a computer along the curved surfaces of the ship 22. Accordingly, the nozzle 14 moves three dimensional path along the surface 20 of the ship in an automated cleaning process. The specific details of the blasting device 31 shown in FIGS. 2-4 may be had by referring to my U.S. Pat. No. 4,545,156 the content of which is incorporated by reference herein.

FIGS. 5-8 illustrate the apparatus 10 of the present invention illustrating the housing 16 having the housing opening 18 and a lower and an upper annular flange 52 and 54. The housing 16 defines a substantially cylindrical housing internal volume 60 having a first and a second cylindrical end 61 and 62 and a cylindrical sidewall 64 extending about a cylindrical axis 65. The housing opening 18 is defined in the second cylindrical end 62 of the housing internal volume 60.

The nozzle 14 is shown as a plurality of nozzles 14A-14D fixed to the nozzle support 50 and aligned with the cylindrical axis 65 of the cylindrical housing internal volume 60. The plurality of nozzles 14A-14D are disposed in a central region 66 surrounded by a peripheral region 68 of the cylindrical housing internal volume 60.

Figure 9:
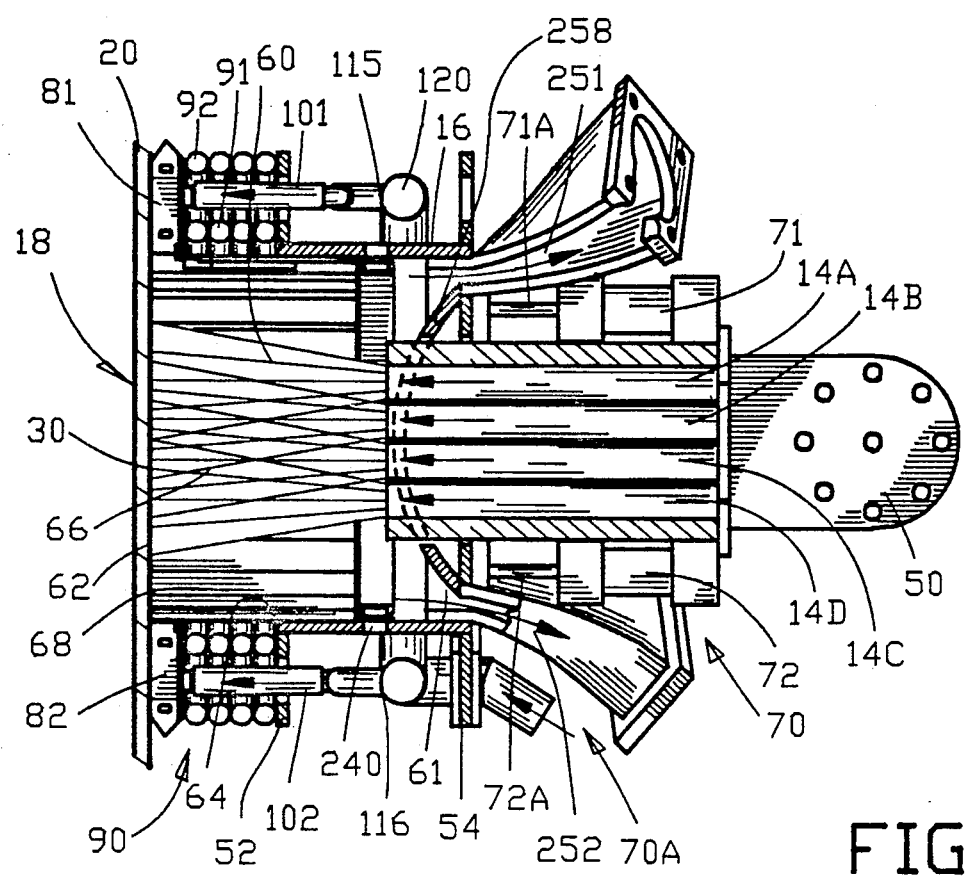
FIG. 9 is a sectional view similar to FIG. 7 with spraying nozzles being disposed in a retracted position.
Figure 10:
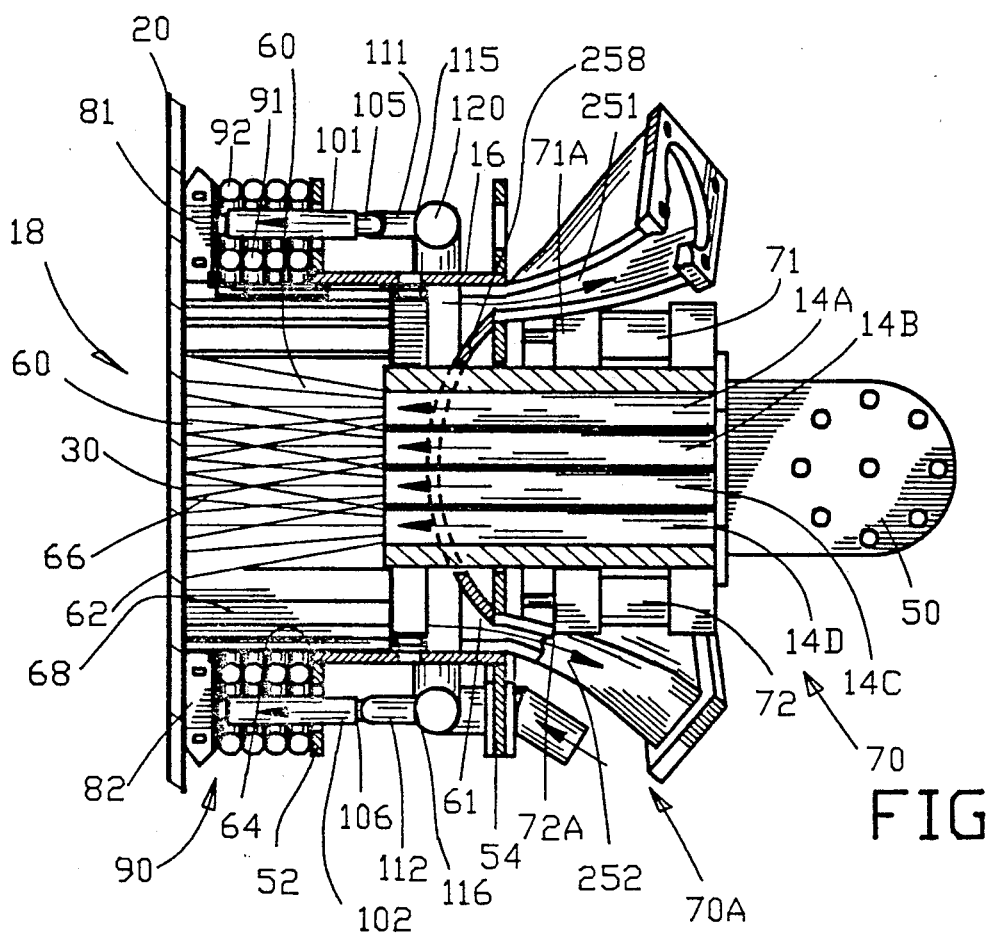
FIG. 10 is a sectional view similar to FIG. 9 with spraying nozzles being disposed in an extended position.

As shown in FIGS. 9 and 10, housing mounting means 70 mounts the housing 16 relative to the nozzle support 50 for enabling the nozzles 14A-14D to project the cleaning material 12 through the housing opening 18 to impact onto the surface 20. The housing mounting means 70 comprise first resilient means comprising four air cylinders shown as air cylinders 71 and 72 having rams 71A and 72A for resiliently mounting the housing 16 relative to the nozzles 14A-14D. The air cylinders 71 and 72 extend rams 71A and 72A for adjusting the housing 16 relative to the nozzle 14A-14D for varying the distance between the nozzles 14A-14D and the surface 20.

FIG. 9 illustrates the nozzles 14A-14D being disposed in a retracted position whereas FIG. 10 illustrates nozzles 14A-14D being disposed in an extended position through the movement of rams 71A and 72A. The variation of the distance between the nozzles 14A-14D and the surface 20 varies the pattern of impact of the cleaning material 12 projected from the nozzles 14A-14D onto the surface 20. The movement of rams 71A and 72A also compensates for small variations in distance between the surface 20 and the mobile platform 32 that are beyond the accuracy of movement of the axes 41-49. Preferably, the movement of rams 71A and 72A are controlled by a computer.

The fluid seal means 30 is shown as a plurality of fluid seal elements 80 including a first and a second fluid seal element 81 and 82 having a first and a second fluid seal port 81A and 82A. The plurality of fluid seal elements 80 are mounted by fluid seal mounting means 90 disposed proximate the housing opening 18 for positioning the fluid seal means 30 between the housing opening 18 and the surface 20.

The fluid seal mounting means 90 includes second resilient means for resiliently mounting the fluid seal elements 80 adjacent to the second cylindrical end 62 of the housing internal volume 60 of the housing 16. The fluid seal mounting means 90 includes an inner and an outer annular pneumatic tubular members 91 and 92 for resiliently mounting the fluid seal elements 80 relative to the lower annular flange 52 extending from the housing 16 as will be described in greater detail hereinafter with reference to FIG. 13.

The plurality of fluid seal elements 80 including the first and second fluid seal element 81 and 82 are connected through flexible hoses including flexible hoses 101 and 102 elbows 105 and 106 and flexible hoses 111 and 112 to a plurality of output tubes including output tubes 115 and 116 of a manifold 120. The manifold 120 is connected through a plurality of inputs including inputs 121 and 122 to the source of low pressure fluid 23A shown in FIG. 2. The inputs 121 and 122 are secured to the upper annular flange 54 for rigidly supporting the manifold 120.

Fluid under pressure from the source of low pressure fluid 23A is individually supplied to each of the plurality of fluid seal elements 80 to emanate from the plurality of fluid seal ports such as ports 81A and 82A as shown by the arrows to create a sealing fluid cushion 130 between the housing 16 and the surface 20 as shown in FIGS. 9 and 10.

Figure 7:
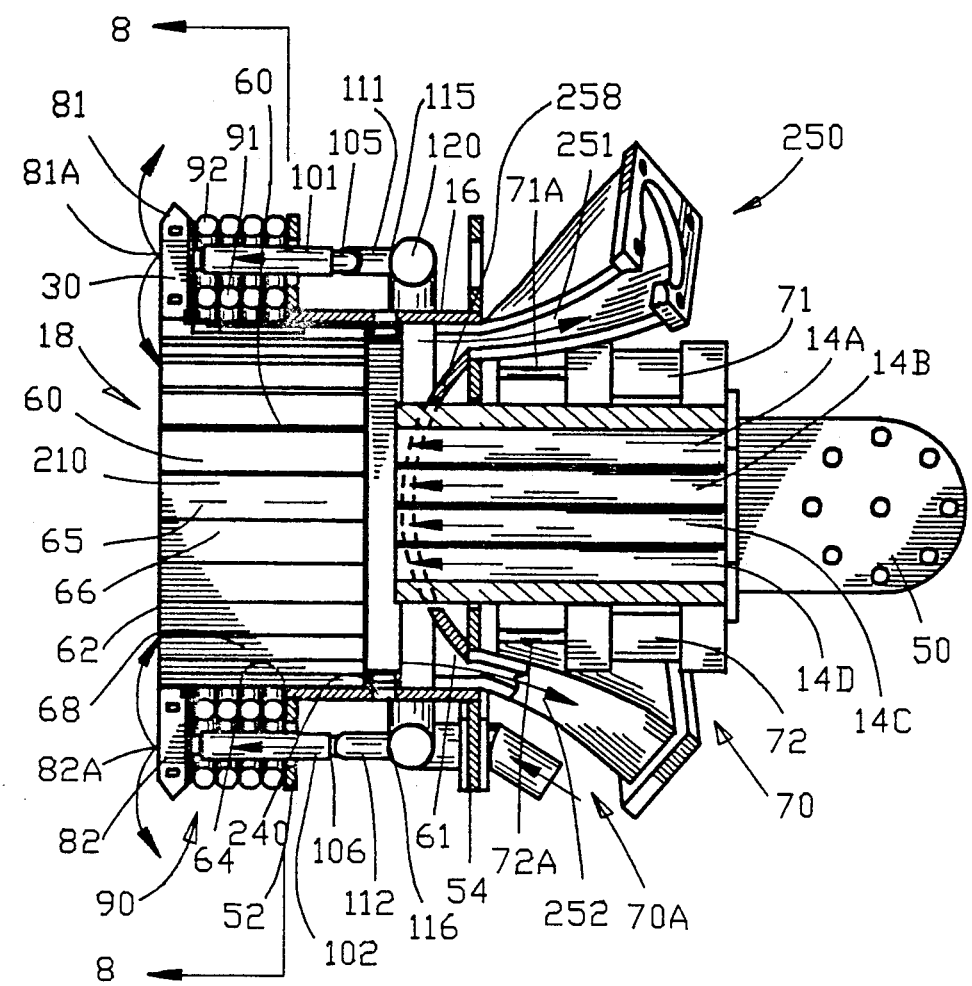
FIG. 7 is an enlarged sectional view of the apparatus of the present invention.
Figure 11:
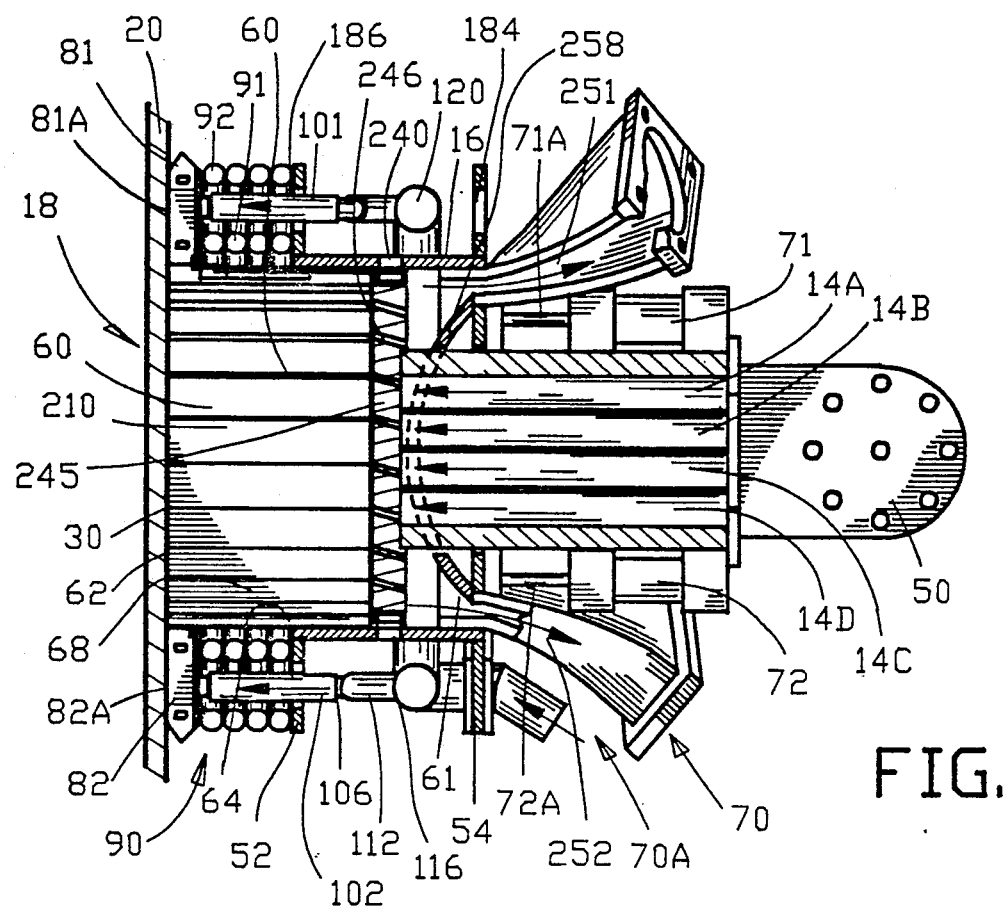
FIG. 11 is a sectional view similar to FIG. 7 with fluid seal means being disposed in a normal position.
Figure 12:
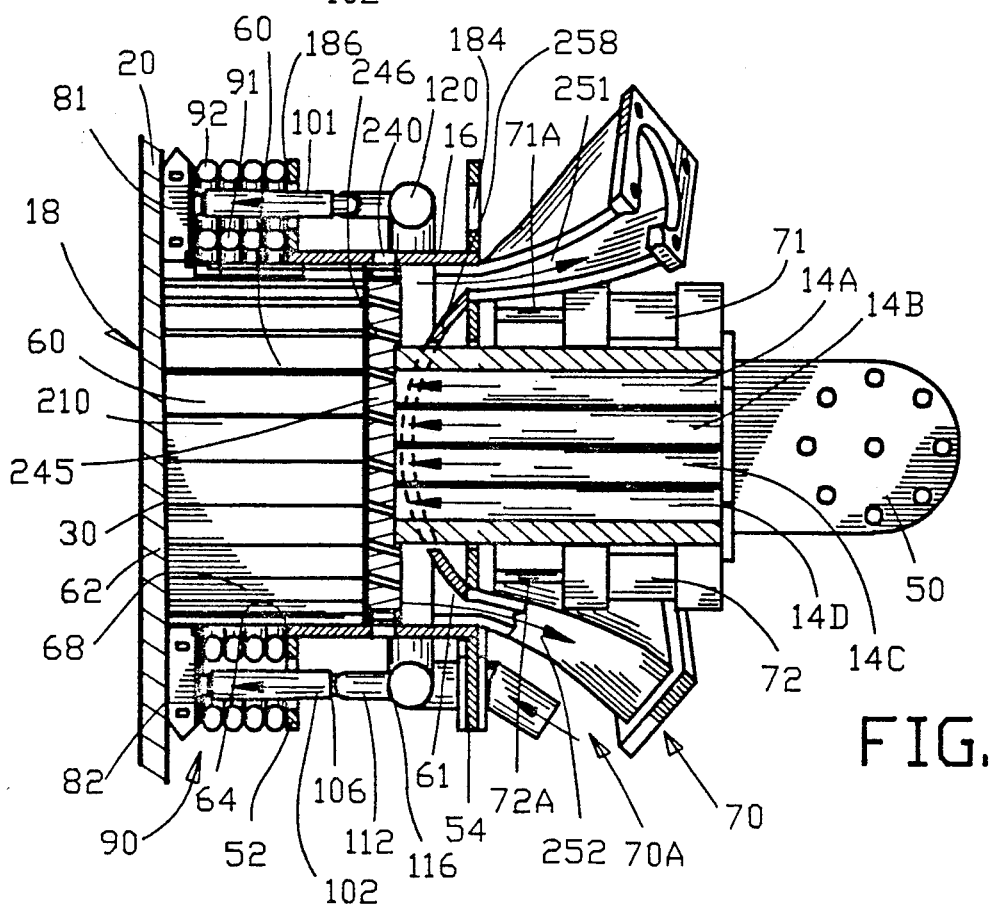
FIG. 12 is a sectional view similar to FIG. 11 with fluid seal means being disposed in a depressed position.

FIG. 11 is a sectional view similar to FIG. 7 with fluid seal elements 81 and 82 being disposed in a normal position whereas FIG. 12 is a sectional view similar to FIG. 11 with the fluid seal element 81 being disposed in a normal position and with the fluid seal element 82 being disposed in a depressed position. The inner and outer annular pneumatic tubular members 91 and 92 in combination with the flexible hoses 101 and 102 and 111 and 112 resiliently and independently mount the first and second fluid seal elements 81 and 82 relative to the lower annular flange 52 of the housing 16. The independent mounting of each of the fluid seal elements 80 enable each of the fluid seal elements 80 to independently move for maintaining the sealing fluid cushion 130 on a curved surface.

FIGS. 13-18 illustrate in greater detail the first fluid seal element 81 comprising a base 140 having sidewalls 141 and 142, an outer end wall 143, an inner end wall 144 and a top wall 145. Preferably, a low friction material 147 is established on a bottom surface 148 of the base 140 for facilitating movement of the fluid seal elements 80 over the surface 20. The outer end wall 143 includes a taper at 149 for facilitating movement of the fluid seal elements 80 over irregularities in the surface 20 such as welding joints and the like.

Figure 5:
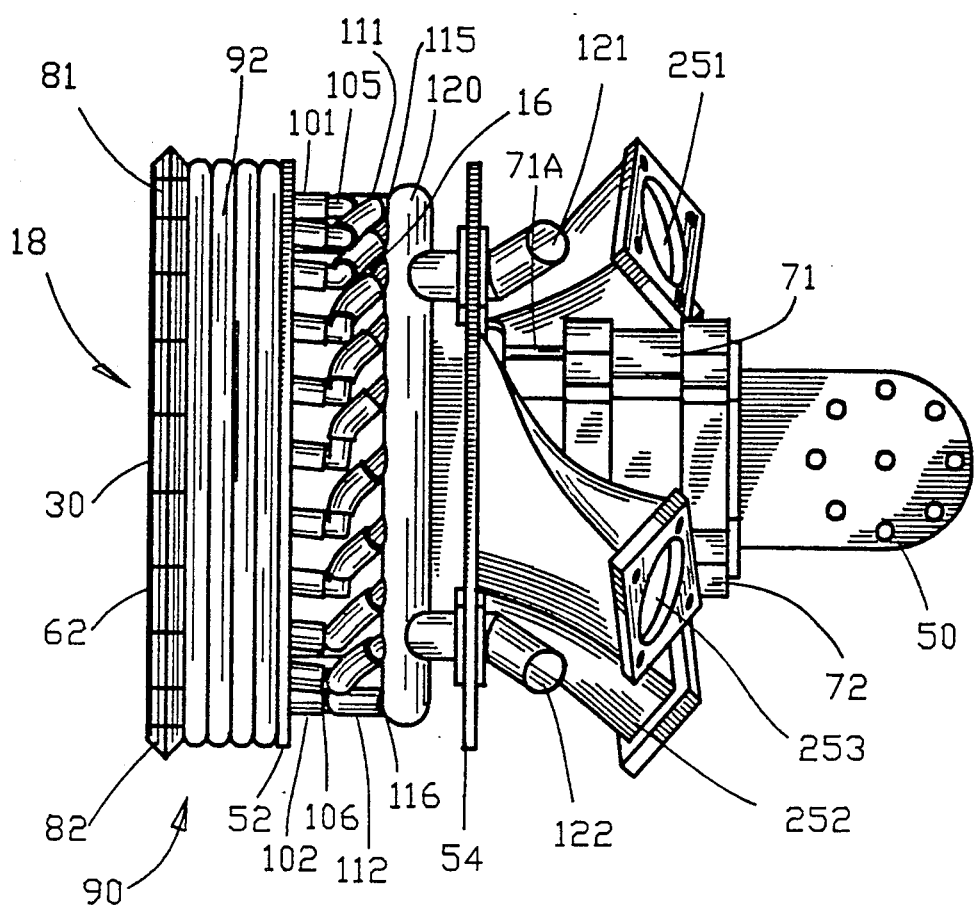
FIG. 5 is an enlarged side elevational view of the apparatus of the present invention.

A tube 150 extends through the top wall 145 and the base 140 with a first end 151 thereof terminating in the port 81A. A second end 152 of the tube 150 is connected to the flexible hose 101 that is connected through the elbow 105 and the flexible hose 111 to the output tube 115 of the manifold 120 as shown in FIGS. 5 and 7.

Figure 8:
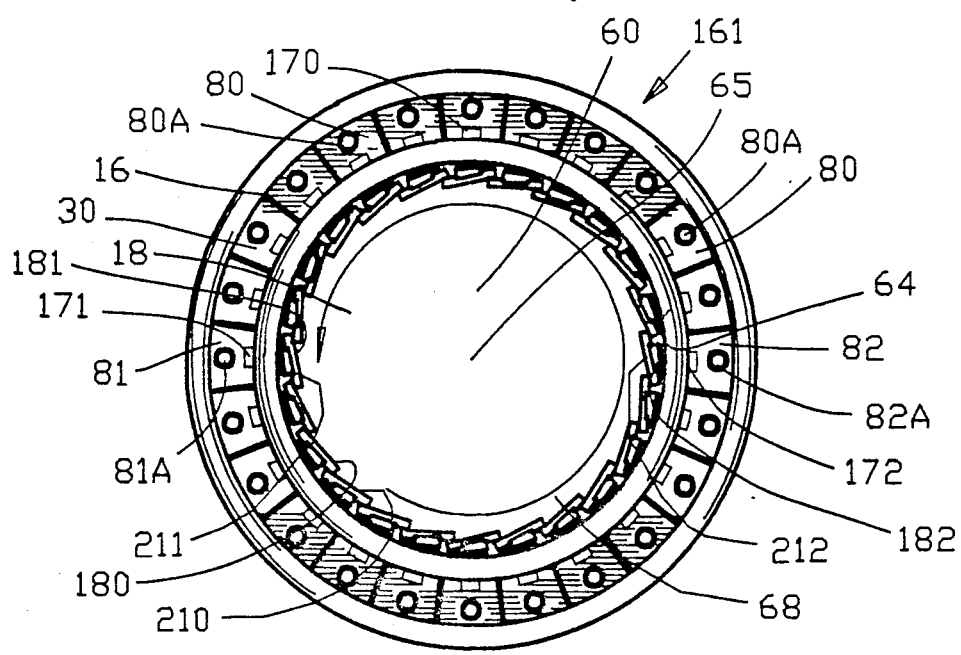
FIG. 8 is a view along line 8-8 in FIG. 7.

The apparatus includes plural vent means for introducing ambient air into the housing 16. As best shown in FIGS. 8, 17 and 18, a first vent means 161 includes first input vents 170 defined within the plurality of fluid seal elements 80 as illustrated by a first input vent 171 and 172 defined in the first fluid seal element 81 for introducing ambient air into the first fluid seal element 81. The first vent means 161 includes first output vents 180 defined within the plurality of fluid seal elements 80 as illustrated by a first output vent 181 defined in the first fluid seal element 81 in FIGS. 17 and 18 for introducing ambient air into the peripheral region 68 of the cylindrical housing internal volume 60 of the housing 16.

The first input vent 171 is defined in the top wall 145 for communicating with the first output vent 181 defined in the inner end wall 144. Ambient air external the housing 16 enters through upper flange holes 184 in the upper annular flange 54 and through lower flange holes 186 in the lower annular flange 52. The ambient air enters the first input vent 171 and is expelled through the first output vent 181 in the first fluid seal element 81 into the cylindrical housing internal volume 60. Preferably, the first output vent 181 is defined to expel the ambient air in a vortex about the peripheral region 68 of the cylindrical housing internal volume 60 as shown by the arrows in FIGS. 6 and 8.

The inner and outer annular pneumatic tubular members 91 and 92 comprise a plurality of inner annular pneumatic tubular members 191-194 and a plurality of outer annular pneumatic tubular members 195-198. The plurality of inner annular pneumatic tubular members 191-194 and the plurality of outer annular pneumatic tubular members 195-198 interconnect the lower annular flange 52 and the top wall 145 of the fluid seal element 81 by suitable means (not shown) such as mechanical fasteners, adhesives or the like.

The plurality of inner annular pneumatic tubular members 191-194 are in fluid communication with one another and are connected to an source of low pressure air (not shown). In a similar manner, the plurality of outer annular pneumatic tubular members 195-198 are in fluid communication with one another and are connected to an source of low pressure air (not shown). The plurality of inner and outer annular pneumatic tubular members 191-194 and 195-198 are independently connected to the source of low pressure air for enabling angular relationship of the plurality of fluid seal elements 80 such as the bottom surface 148 of the first fluid seal element 81 to be varied relative to the lower annular flange 52. Preferably, the plurality of inner and outer annular pneumatic tubular members 191-194 and 195-198 are independently connected to the source of low pressure air for establishing the plurality of fluid seal elements 80 to be parallel to the surface 20.

FIGS. 13-18 illustrate a retaining means 200 shown as retaining springs 201 and 202 extending through sidewall apertures 141A and 142A within the sidewalls 141 and 142 for interconnecting the plurality of fluid seal elements 80. The retaining springs 201 and 202 establish a mechanical engagement between the sidewalls of adjacent fluid seal elements 80. The sidewall apertures 141A and 142A are elongated for enabling the fluid seal elements 80 to rotate as shown by the first fluid seal element 81 in FIGS. 15 and 16 relative to an adjacent fluid sealing element 80. The sidewall apertures 141A and 142A also maintain the mechanical engagement between the sidewalls of adjacent fluid seal elements 80 during the rotation thereof. The flexible hoses 101 and 111 further facilitate the freedom of movement of the first fluid seal element 81.

The plurality of inner and outer annular pneumatic tubular members 191-194 and 195-198 enable the fluid seal elements 80 to pivot as shown by the first fluid seal element 81 in FIGS. 17 and 18. The independent rotation of the first fluid seal element 81 as shown in FIGS. 15 and 16 and the independent pivoting of the first fluid seal element 81 as shown in FIGS. 17 and 18 enables the fluid seal elements 80 to maintain the air seal 30 with a curve in the surface 20. The flexible hoses 101 and 111 further facilitate the freedom of movement of the first fluid seal element 81.

Figure 19:
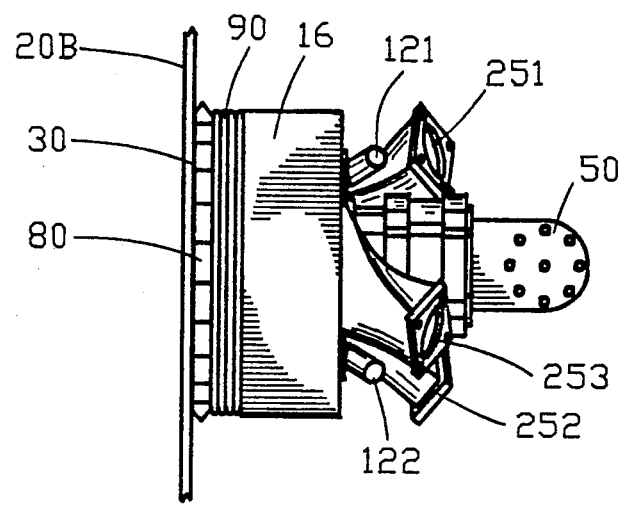
FIG. 19 is a side elevational view of the apparatus engaging a flat surface.

FIG. 19 is a side elevational view of the apparatus 10 engaging a flat surface 20B wherein the fluid seal elements 80 are in a normal biased position.

Figure 20:
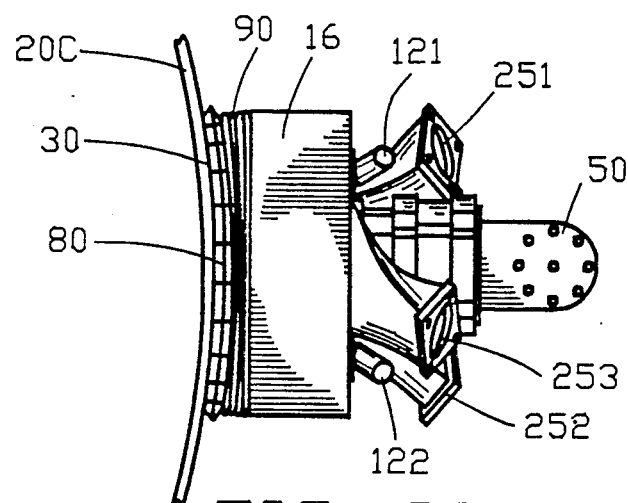
FIG. 20 is a side elevational view similar to FIG. 19 of the apparatus engaging a convex surface.

FIG. 20 is a side elevational view similar to FIG. 19 of the apparatus 10 engaging a convex surface 20C wherein the fluid seal elements 80 are rotated as shown in FIGS. 15 and 16 and are pivoted as shown in FIGS. 17 and 18 to maintain the air seal 30 with the convex surface 20C.

Figure 21:
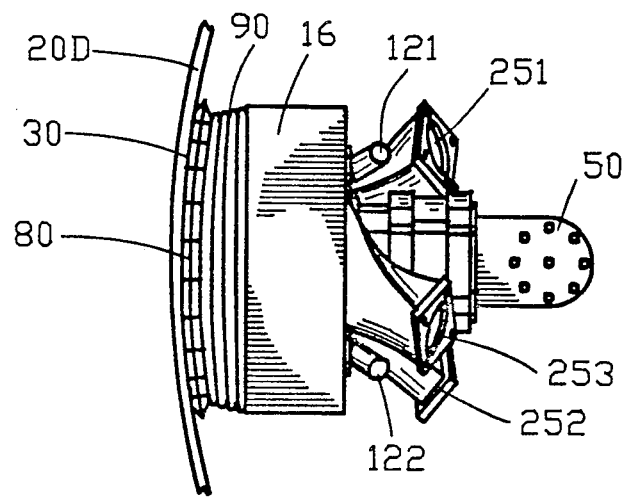
FIG. 21 is a side elevational view similar to FIG. 19 of the apparatus engaging a concave surface.

FIG. 21 is a side elevational view similar to FIG. 19 of the apparatus 10 engaging a concave surface 20D wherein the fluid seal elements 80 are rotated as shown in FIGS. 15 and 16 and are pivoted as shown in FIGS. 17 and 18 to maintain the air seal 30 with the concave surface 20D.

When the fluid seal elements 80 are rotated as shown in FIGS. 15 and 16 the retaining springs 201 and 202 are able to move within the elongated sidewall apertures 141A and 142A for maintaining the mechanical engagement between the sidewalls of adjacent fluid seal elements 80. The mechanical engagement between adjacent sidewalls of the fluid seal elements 80 creates a seal between the adjacent fluid seal elements 80 for inhibiting any of the impacted cleaning material 12A, the surface material 20A and any contaminants 28 therein from being discharged from the housing 16 through voids or spaces between adjacent fluid seal elements 80.

The plurality of fluid seal elements 80 including the first and second fluid seal elements 81 and 82 pivotably support a plurality of louver panels 210 including louver panels 211 and 212 for directing the ambient air expelled from the first vent means 161 including first output vent 181 into the housing 16.

The first fluid seal element 81 pivotably supports the louver panel 211 through a pivot 211A secured to a mounting 216 extending from the base 145 of the first fluid seal element 81. A spring 218 biases the louver panel 211 into a parallel relationship with the cylindrical sidewall 64 of the housing 16 as shown in FIG. 13. Preferably, the pivot 211A pivots a backplate 222 having a dovetail projection 224. A dovetail recess 226 defined in the louver panel 211 enables the louver panel 211 to be removably secured to the backplate 222 to facilitate replacement of the louver panel 211.

Figure 6:
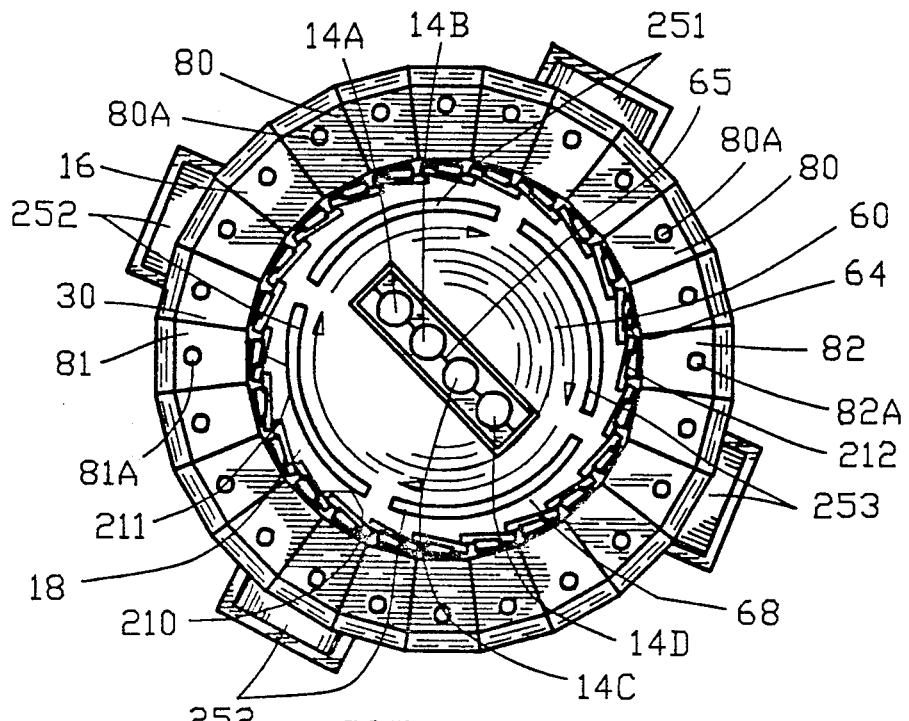
FIG. 6 is a left end view of FIG. 5.

As shown in FIGS. 6 and 8, the plurality of louver panels 210 including louver panels 211 and 212 introduce the ambient air into the housing 16. The plurality of louver panel 210 including louver panels 211 and 212 are angularly mounted relative in an overlapping relationship for retaining the impacted cleaning material 12A, the surface material 20A and any contaminants 28 within the housing 16. In addition, the plurality of louver panel 210 protect the plurality of inner and outer annular pneumatic tubular members 191-194 and 195-198 and the fluid seal elements 80 from being impacted by rebounding impacted cleaning material 12A, the surface material 20A and any contaminants 28.

The angularly mounting and the overlapping relationship of the plurality of louver panels 210 including louver panels 211 and 212 create a plurality of vent slots therebetween. The directional or angular relationship of the louver panels 211-214 enables ambient air entering through the upper flange holes 184 to be directed through the vent slots to create a vortex of air flow as shown by the arrows in FIGS. 6 and 8 within the peripheral region 68 of the housing internal volume 60 of the housing 16.

A second vent means 162 includes a plurality of apertures 240 defined in the sidewall 64 of the housing 16 communicating with a director ring 245. The director ring 245 includes a plurality of angularly disposed orifices 246 for directing ambient air entering the plurality of apertures 240 and being expelled by the plurality of angularly disposed orifices 246 for assisting the creation of the vortex of air flow as shown by the arrows in FIGS. 6 and 8. The second vent means 162 also eliminates the impacted cleaning material 12A, the surface material 20A and any contaminants 28 therein from accumulating on the sidewall 64 of the housing 16.

A third vent means 163 comprises a portion of the air emanating from the fluid seal port 81A and 82A entering into the housing 16 as shown by the arrow. A remaining portion of the air emanating from the fluid seal port 81A and 82A discharges from the housing 16 as shown by the arrow.

The apparatus 10 includes vacuum connection means 250 including a first through fourth angularly orientated vacuum port 251-254 disposed proximate the first cylindrical end 61 of the housing 16 adjacent the cylindrical sidewall 64 of the housing internal volume 60 of said housing 16. The vacuum ports 251-254 define arcuate input slots 251A-254A communicating with output ports 251B-254B of the vacuum port 251-254. The output ports 251B-254B are connected through the vacuum hoses 26 to the vacuum source 25 as shown in FIG. 2 and form a partial helical shape. A housing dome 258 is disposed at the first cylindrical end 61 of the cylindrical housing internal volume 60 for cooperating with the angularly orientated vacuum port 251-254 for enhancing the fluid dynamics of the vortex.

Figure 22:
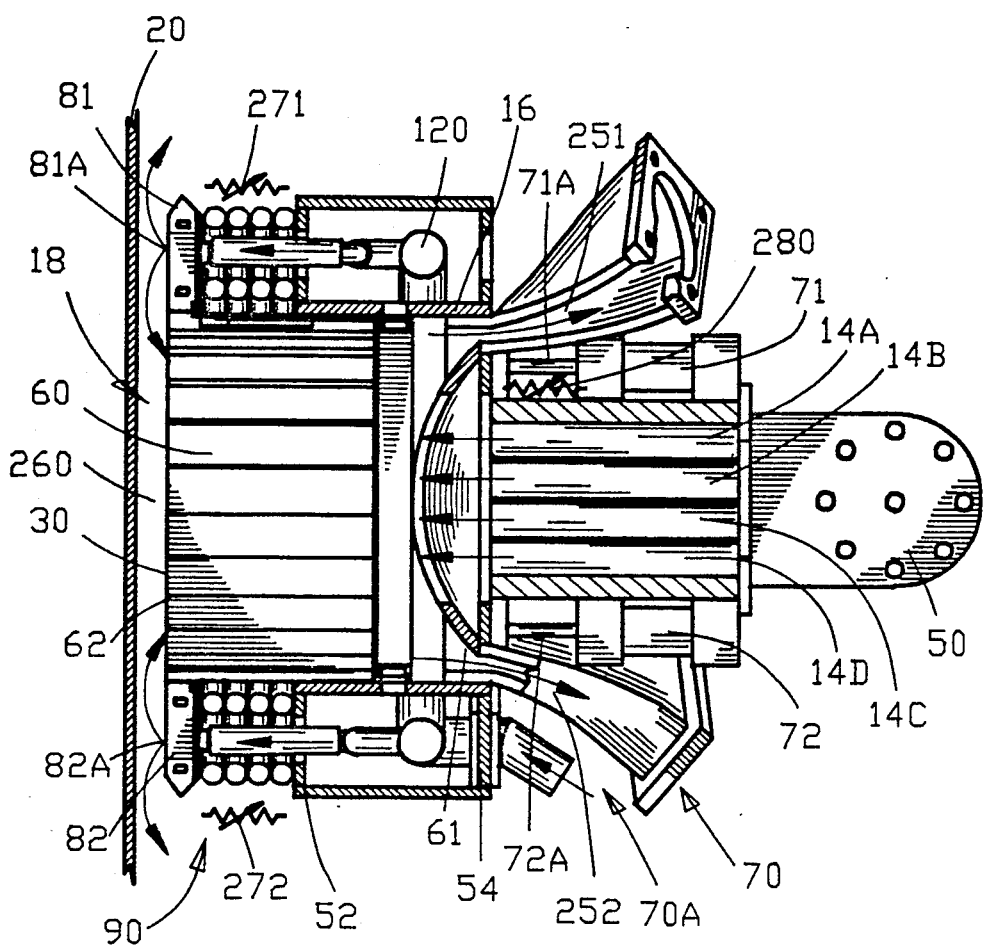
Figure 23:
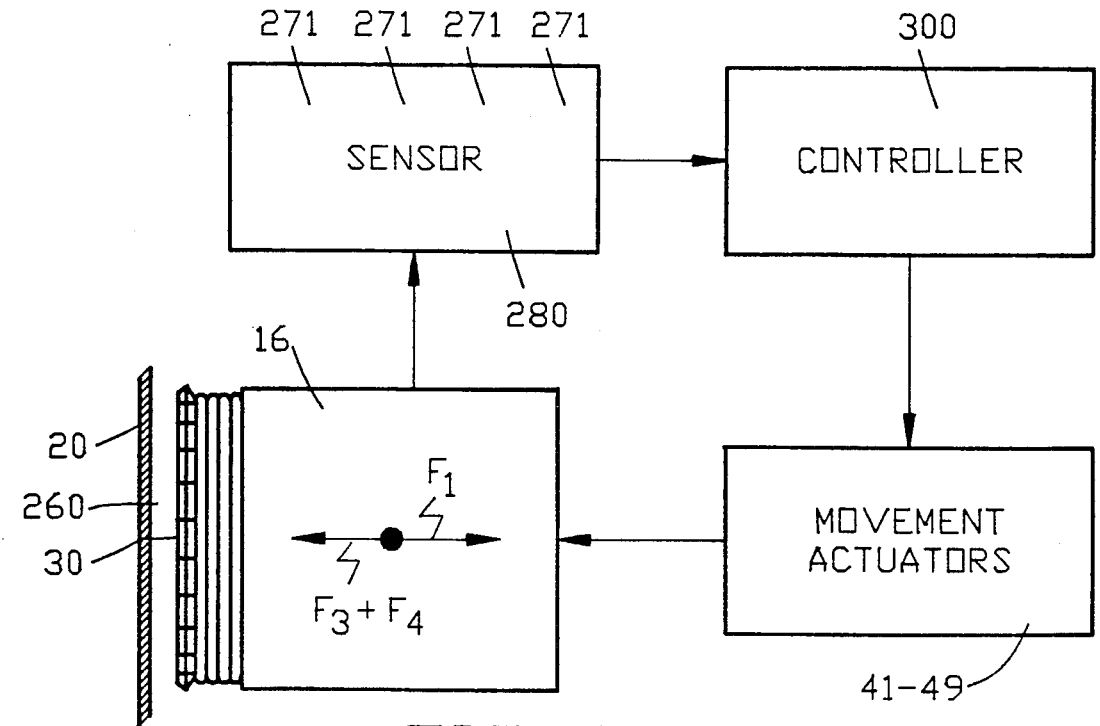
FIG. 23 is a block diagram of the forces present during the operation of the apparatus.
Figure 24:
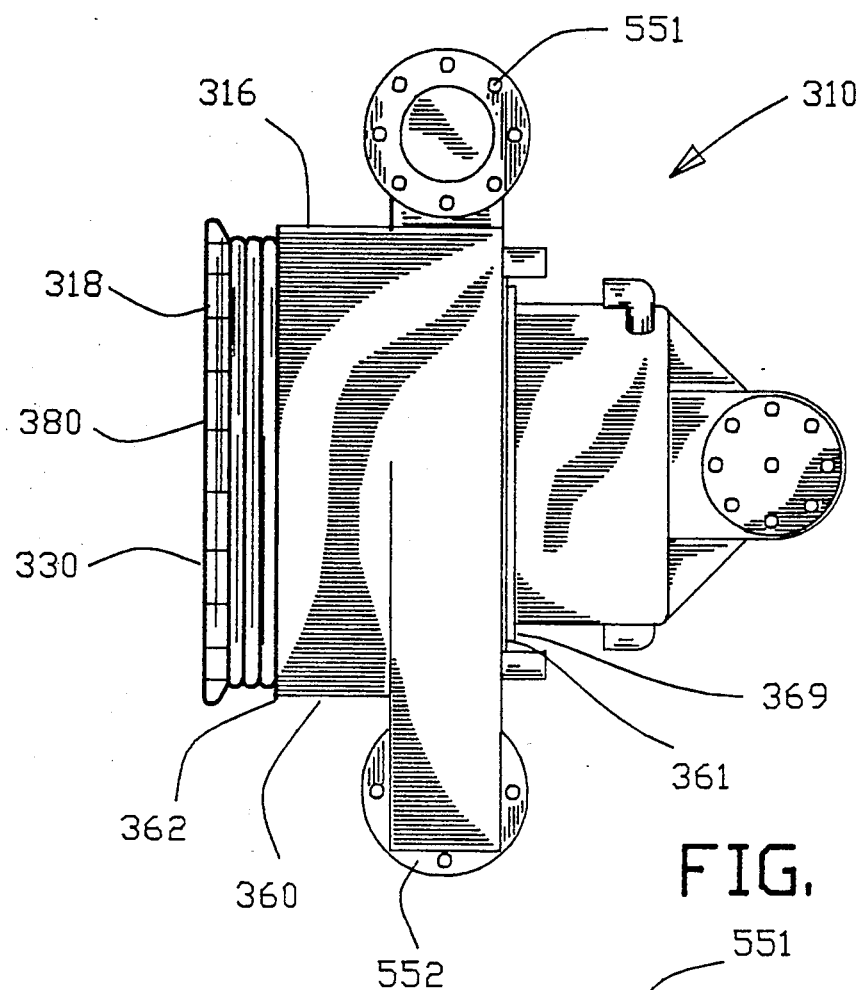
FIG. 24 is a side elevational view of a second embodiment of the apparatus of the present invention.

The operation of the apparatus 10 can best be described with reference to FIGS. 22 and 23. When the vacuum source 25 is connected to the vacuum ports 251-254, a partial vacuum is established within the cylindrical housing internal volume 60. The air seal 30 creates a seal between the cylindrical housing internal volume 60 and the surface 20. The first, second and third vent means 161-163 introduce ambient air into the cylindrical housing internal volume 60 for creating an air flow from the ambient into the housing 16. The air flow from the ambient into the housing 16 is continuously removed from the cylindrical housing internal volume 60 by the vacuum source 25.

During the operation of the device, the cleaning material 12 is projected from the nozzles 14A-14D onto the surface 20 from the central region 66 of the housing internal volume 60. The orientation of the first through third vent means 161-163, and the Vacuum ports 251-254 establish the vortex within the housing internal volume 60 of the housing 16 as shown by the arrows in FIGS. 6 and 8. The vortex is confined to the peripheral region 68 the housing internal volume 60 such that the vortex does not interfere with cleaning material 12 being projected from the nozzles 14A-14D onto the surface 20. The air flow from the ambient into the housing 16 and more specifically the vortex, collects and removes the impacted cleaning material 12A, the surface material 20A and any contaminants 28 through the vacuum ports 251-254. The impacted cleaning material 12A, surface material 20A and any contaminants 28 are contained within the housing 16 and are removed through the vacuum ports 251-254.

When the apparatus 10 is used in a sand blasting process, the total ambient air [$AIR_{am}$] entering the cylindrical housing internal volume 60 of the housing 16 is:

$$AIR_{am} = AIR_{161} + AIR_{162} + AIR_{163} \quad [1]$$

and the total air [$AIR_{in}$] entering the cylindrical housing internal volume 60 of the housing 16 is:

$$AIR_{in} = AIR_{am} + AIR_{noz} \quad [2]$$

where [$AIR_{noz}$] is the air entering from the nozzles 14A-14D. The total air [$AIR_{out}$] being removed from the cylindrical housing internal volume 60 of the housing 16 by the vacuum ports 251-254 must be:

$$AIR_{out} \geq AIR_{in} \qquad [3]$$

When the total air being removed from the housing 16 by the vacuum ports 251-254 is equal or greater than the total air entering the housing 16, substantially all of the impacted cleaning material 12A, surface material 20A and any contaminants 28 are removed from the housing 16.

The fluid seal elements 80 are subjected to four separate forces that must be controlled and balanced for proper operation of the apparatus. The air emanating from the fluid seal ports 80A including the first and second ports 81A and 82A of the first and second fluid seal elements 81 and 82 produces a first force $[F_1]$ that creates a space the fluid seal elements 81 and 82 from contacting the surface 20. The first force $[F_1]$ is variable dependent upon the space 260 between fluid seal elements 81 and 82 and the surface 20. When the space 260 is decreased, the first force $[F_1]$ is increased whereas when the space 260 is increased, the force $[F_1]$ is decreased. Depending upon the type and strength of the surface 20, the first force $[F_1]$ has a desired value $[F_{1-pf}]$.

The fluid seal elements 80 are resiliently mounted by the inner and outer annular pneumatic tubular member 91 and 92. The inner and outer annular pneumatic tubular member 91 and 92 provide a resilient mounting second force $[F_2]$ which is equal to $[F_{1-pf}]$.

The partial vacuum produced within the cylindrical housing internal volume 60 of the housing 16 provides a third force $F_3$ in opposition to the first force $F_1$ produced by the fluid seal elements 80. The fourth force $F_4$ is the resultant force applied by the mobile platform 32 and axes 41-49 that is applied through the rams 71A and 72A of the air cylinders 71 and 72. In the desired operation mode, the forces are maintained in equilibrium or $$F_{1-pf} = F_3 + F_4 \qquad [4]$$

In order to maintain this equilibrium, the apparatus 10 incorporates primary and secondary sensors 270 and 280. Although various sensors may be utilized with the present invention, linear potentiometer or linear variable differential transformers have been found suitable for use in the present invention. The primary sensors 270 are distributed about the inner and outer annular pneumatic tubular member 91 and 92. Preferably, four primary sensors 270 including a first and a second primary sensor 271 and 272 in FIG. 22 are disposed in radial alignment with the four rams of the four air cylinders including rams 71A and 72A of the first and second rams 71 and 72. The primary sensors including the first and second primary sensors 271 and 272 sense the relative movement between the first and second fluid seal elements 81 and 82 and the housing 16.

The secondary sensor 280 is disposed adjacent to the ram 71A of the air cylinder 71. The secondary sensor 280 sense the relative movement between the housing 16 and the nozzle support 50.

When the primary sensors 270 sense an excessive non-uniform compression of the inner and outer annular pneumatic tubular member 91 and 92, a controller 300 adjusts the pitch, roll and yaw of the axes 41-49 of the mobile platform 32 to bring the housing 16 into perpendicular alignment with the surface 20.

When the adjustment of the rams 70A of air cylinders 70 is (1) at an extreme position, (2) beyond the limits of movement of the rams 70A or (3) disrupts the desired patten of the nozzles 14A-14D, the controller 300 will adjust the X, Y and Z axes 41-49 of the mobile platform 32 to reestablish the desired space 260 or standoff distance set forth in equation [4] as well as the desired extension of rams 70A.

When the primary sensors 270 sense an excessive or insufficient non-uniform compression of the inner and outer annular pneumatic tubular member 91 and 92, the non-uniform compression indicates that cylindrical axis 65 of the cylindrical housing internal volume 60 of the housing 16 is not perpendicular to the surface 20. The non-perpendicular relationship may be caused by either the position of the mobile platform 32 relative to the surface 20 or may be caused by a curvature in the surface 20 as shown by the ship 22 in FIG. 1. The excessive or insufficient non-uniform compression of the inner and outer annular pneumatic tubular member 91 and 92 results in the controller 300 adjusting the axes 41-49 of the mobile platform 32 to reestablish the perpendicular position of the housing 16 relative to the surface 20 and to reestablish the desired equilibrium set forth in equation [4] as well as the desired extension of rams 70A.

An example of the present invention has been constructed with the cylindrical housing internal volume 60 having a diameter of 18 inches and a length between the first and second cylindrical ends 61 and 62 of 14 inches. The majority of the components including the housing 16, the fluid seal elements 80 and the plurality of louver panels 210 were constructed of 0.375 inch to 0.75 inch ultra high molecular weight polyethylene (UHMWPY) having a total weight of approximately 70 pounds.

Four nozzles 14A-14D were used discharging $[AIR_{noz}]$ at 1200 cubic feet per minute (CFM) from the source of high pressure fluid 23. The vacuum ports 251-254 had a total approximately area of 50 square inches and removed approximately air $[AIR_{out}]$ at the rate of 2000 cubic feet per minute (CFM) by the vacuum source 25.

Twenty-four fluid seal elements 80 were utilized with each having a surface area of approximately 5 square inches. The source of the low pressure fluid 23A furnished a total of 400 cubic feet per minute (CFM) at 5 to 20 pounds per square inch (PSI) to the fluid seal ports 80A resulting in a total desired first force $[F_{1-pf}]$ of 600 to 2400 pounds. The inner and outer annular pneumatic tubular member 91 and 92 were pressurized at a pressure of 1 to 3 pounds per square inch for producing the second force $[F_2]$. Four air cylinders 70 were used each having a piston surface area of 1.5 square inches with a pressure of 10 pounds per square inch (PSI) resulting in a fourth force $F_4$ of approximately 60 pounds.

The improved apparatus totally collected the impacted cleaning material and the material removed from the cleaned surface making the apparatus safe for both the operator and the environment. Although the apparatus has been shown with reference to a sand blasting device, the invention is adaptable to various types of cleaning devices. The apparatus is light-weight and durable and has a life expectancy commensurate with the life expectancy of blast nozzles.

FIGS. 24-28 illustrate a second embodiment of the apparatus 310 of the present invention illustrating the housing 316 having the housing opening 318. The housing 316 defines a substantially cylindrical housing internal volume 360 having a first and a second cylindrical end 361 and 362 and a cylindrical sidewall 364 extending about a cylindrical axis 365. The housing opening 318 is defined in the second cylindrical end 362 of the housing internal volume 360. A first housing end wall 369 is secured to the first cylindrical end 361 of the housing 316.

The nozzle 314 is shown as a plurality of nozzles 314A-314C fixed to a nozzle support 350 with the plurality of nozzles 314A-314C being radially aligned with the cylindrical axis 365 of the cylindrical housing internal volume 360. The plurality of nozzles 314A-314C are disposed in a central region 366 surrounded by a peripheral region 368 of the cylindrical housing internal volume 360. The housing mounting means 370 mounts the nozzle support 350 relative to the housing 316 for enabling the nozzles 314A-314C to project the cleaning material 12 through the housing opening 318 to impact onto the surface 20.

Figure 28:
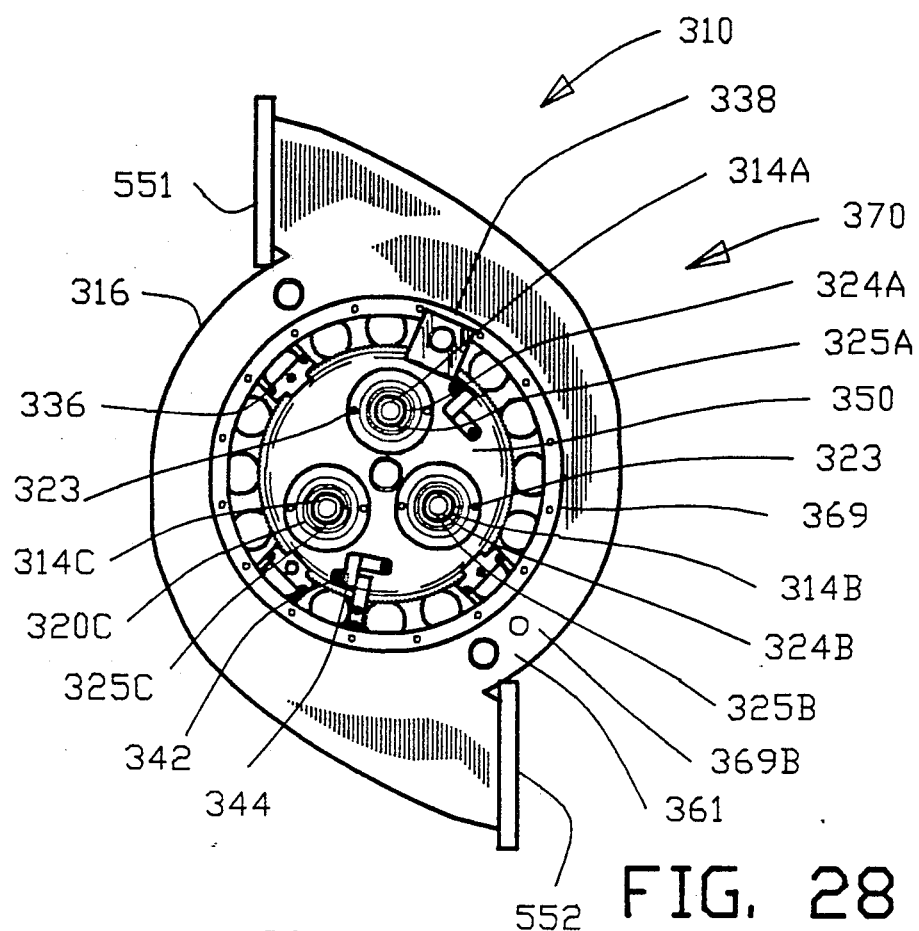
FIG. 28 is a sectional view along line 28—28 in FIG. 26.
Figure 29:
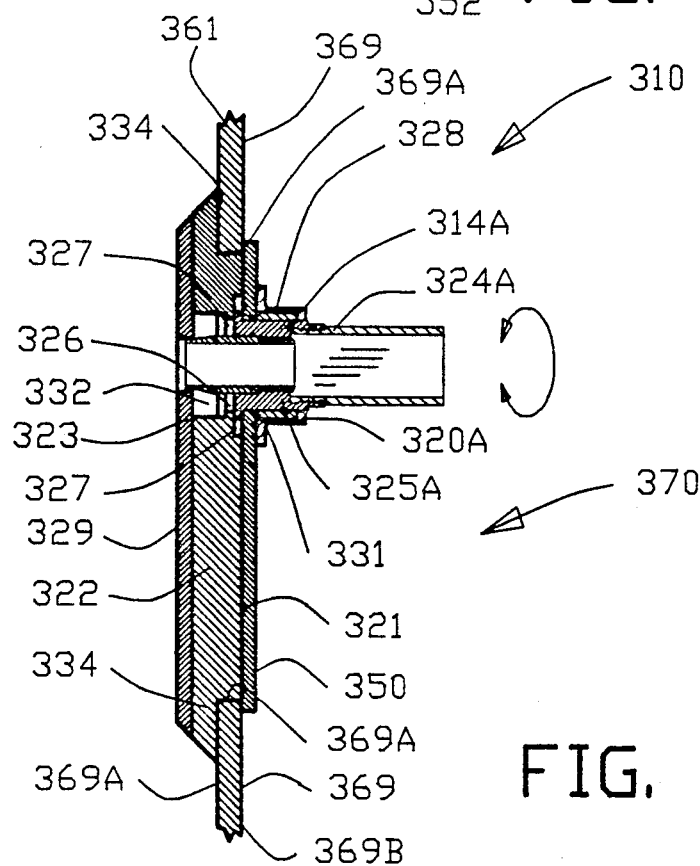
FIG. 29 is a partial sectional view along line 29—29 in FIG. 28.

As best shown in FIGS. 28 and 29, each of the plurality of nozzles 314A-314C is mounted to a nozzle flange 320A-320C. The nozzle flanges 320A-320C are secured to the nozzle support 350. The nozzle support 350 comprises an outer disk 321, an inner disk 322 and an inner cover plate 323. The nozzle flanges 320A-320C are secured by bolts 323 extending through the nozzle flanges 320A-320C and engaging with bolt holes sets (not shown) defined in the inner disk 322. Preferably, a multiplicity of bolt holes sets (not shown) are defined in the outer disk 321 and the inner disk 322 for enabling the radial position of each of the plurality of nozzles 314A-314C to be varied relative to the cylindrical axis 365 of the cylindrical housing internal volume 360. A plurality of hoses 324A-324C are secured to the plurality of nozzles 314A-314C.

In this embodiment, the outer disk 321 and the inner disk 322 define three bolt holes sets (not shown) for positioning the plurality of nozzles 314A-314C into three radial position relative to the cylindrical axis 365 of the cylindrical housing internal volume 360.

Figure 25:
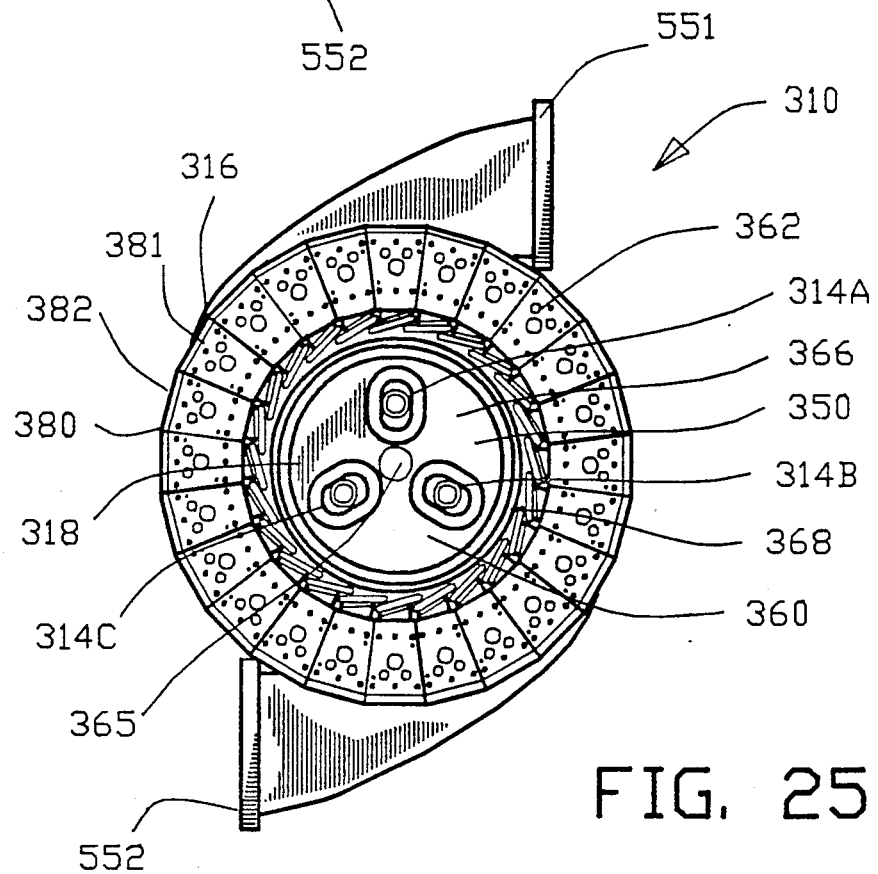
FIG. 25 is a left end view of FIG. 24.
Figure 30A:
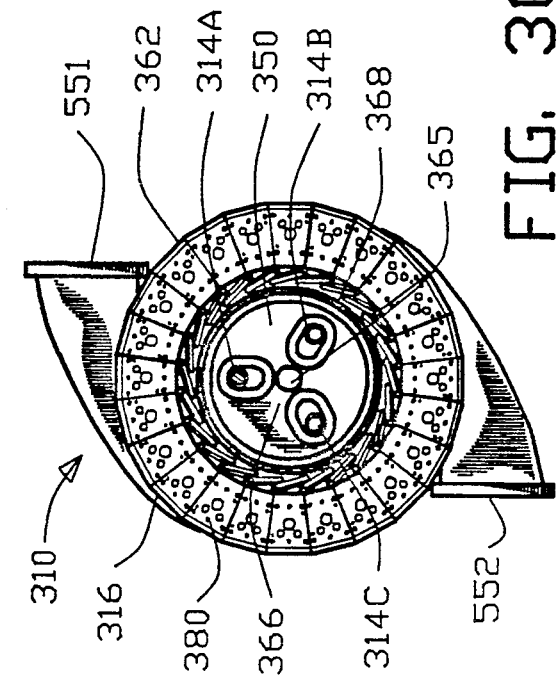
FIG. 30A is a left end view similar to FIG. 25 further illustrating the nozzles of FIG. 30.
Figure 31A:
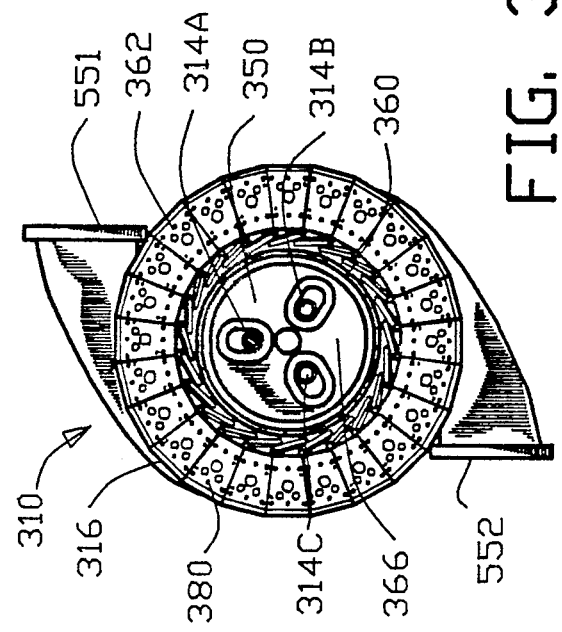
FIG. 31A is a left end view similar to FIG. 25 further illustrating the nozzles of FIG. 31.
Figure 30:
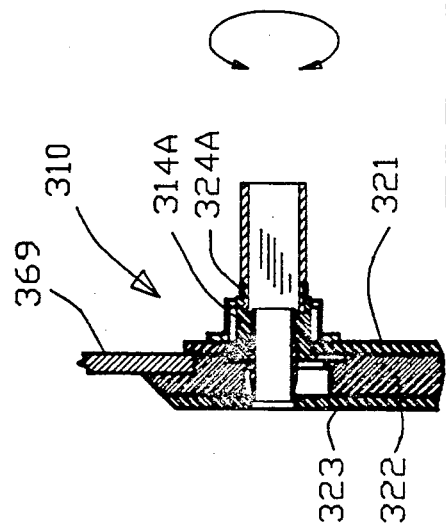
FIG. 30 is a sectional view similar to FIG. 29 with spraying nozzles being disposed in an outward position.
Figure 31:
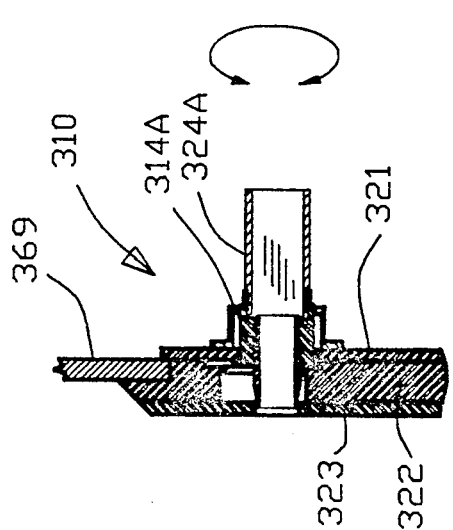
FIG. 31 is a sectional view similar to FIG. 29 with spraying nozzles being disposed in an inward position.

FIGS. 25 and 29 illustrates the plurality of nozzles 314A-314C in an intermediate radial position relative to the cylindrical axis 365. FIGS. 30 and 30A illustrates the plurality of nozzles 314A-314C in an outward radial position relative to the cylindrical axis 365 whereas FIGS. 31 and 31A illustrates the plurality of nozzles 314A-314C in an inward radial position relative to the cylindrical axis 365. The selected radial position of the plurality of nozzles 314A-314C relative to the cylindrical axis 365 predetermines the width and intensity of the pattern of impact of the cleaning material 12 projected from the plurality of nozzles 314A-314C onto the surface 20. The outward radial position as shown in FIGS. 30 and 30A provides a wide pattern whereas the inward radial position as shown in FIGS. 31 and 31A provides an intense spray pattern.

The plurality of nozzles 314A-314C are rotatably sealed to the nozzle flanges 320A-320C by rotatable hose couplings 325A-325C as indicated by the arrows. The rotatable hose couplings 325A-325C between the plurality of nozzles 314A-314C and the nozzle flanges 320A-320C prevent binding or deformation of the plurality of hoses 324A-324C during operation of the apparatus 310.

As best shown in FIG. 29, the rotatable hose coupling 325A includes a lip 326 received within a recess 327 of the inner disk 322. The inner disk 322 is secured to the outer disk 321 by conventional mechanical means (not shown) such as bolts or the like. The lip 326 is rotatably secured within the recess 327 between the inner disk and the outer disk 321 and 322. A bearing 328 journals the rotatable hose coupling 325A relative to the flange 320A.

The inner disk 321 has a plurality of radially extending elongated inner breaches 331 uniformly distributed about the cylindrical axis 365 of the cylindrical housing internal volume 360. The outer disk 322 has a plurality of radially extending elongated outer breaches 332 uniformly distributed about the cylindrical axis 365 of the cylindrical housing internal volume 360.

The inner disk 321 and the outer disk 322 are disposed on an inner surface and outer surface 369A and 369B of the first housing end wall 369. The first housing end wall 369 includes an aperture 369A extending about the elongated inner and outer breaches 331 and 332 of the inner and outer disks 321 and 322. The inner disk 322 includes a shoulder 334 for receiving the first housing end wall 369 therein. When the inner disk 322 is secured to the outer disk 322, the first housing end wall 369 is rotatably secured between the outer and inner disks 321 and 322 for rotatably mounting the nozzle support 350 along the cylindrical axis 365 of the cylindrical housing internal volume 360. An inner plate 323 is secured to the inner disk 322 for providing protection for the inner disk 322 and for closing any exposure of the breaches 332 in the inner disk 332.

As shown in FIG. 28, a drive gear 336 is secured to the outer disk 321. An enclosure 338 is secured to the first housing end wall 369 and contains a motor for driving a power gear (not shown). Plural idler gears 340 engage with the drive gear 336 to rotate the nozzle support 350 relative to the housing 316. A sensor gear 342 is connected to a position sensor 344 for sensing the rotational position of the nozzle support 350 relative to the housing 316.

Figure 32:
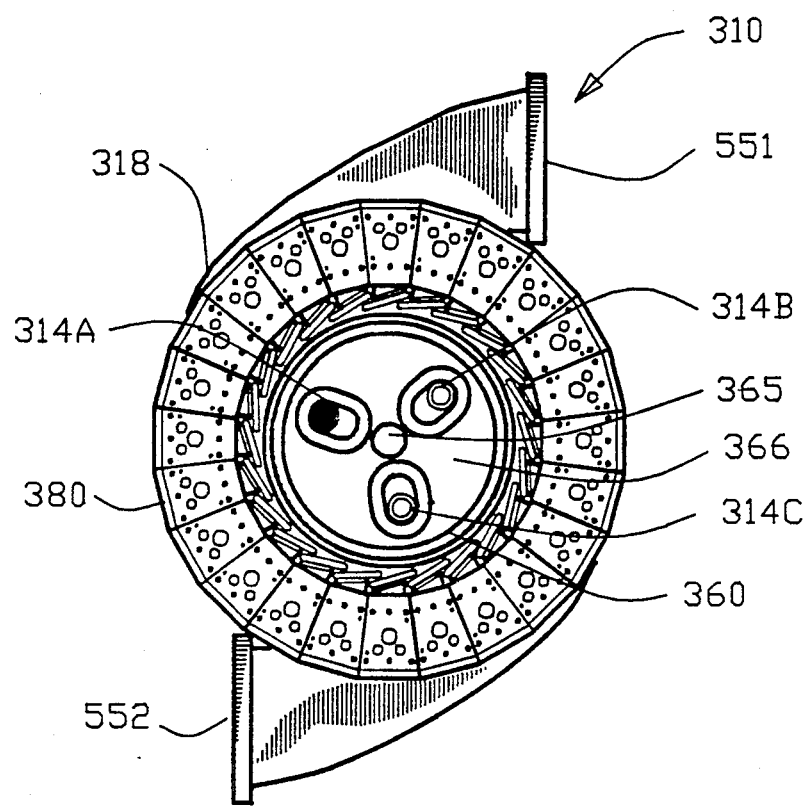
FIG. 32 is a left end view similar to FIG. 25 illustrating the nozzles rotated into a counterclockwise position.
Figure 33:
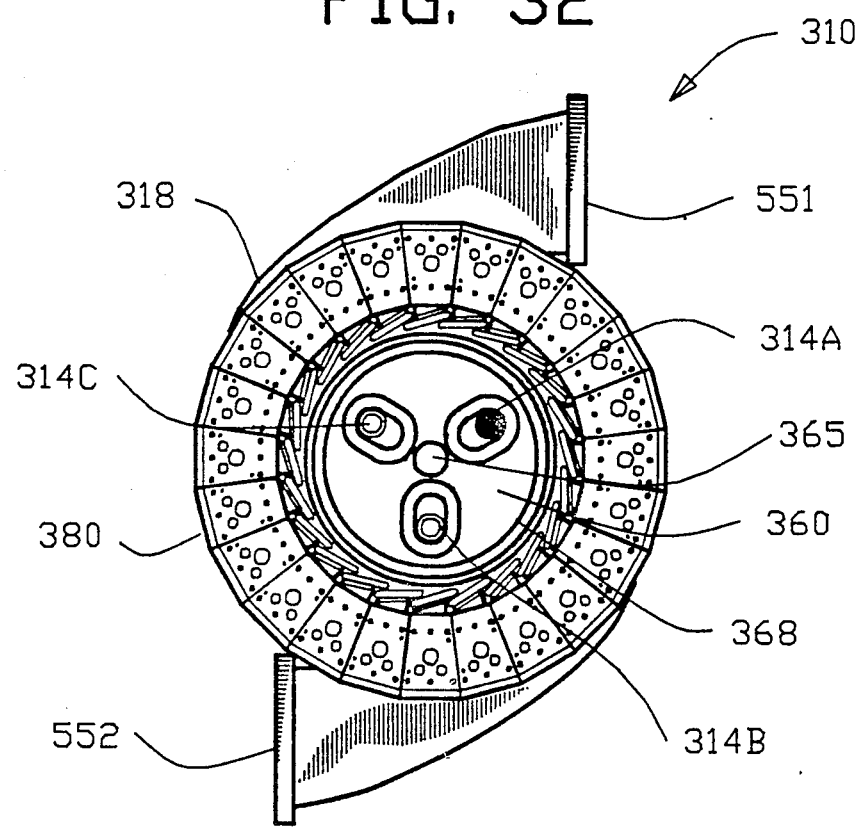
FIG. 33 is a left end view similar to FIG. 25 illustrating the nozzles rotated into a clockwise position.

FIG. 32 is a left end view similar to FIG. 25 illustrating rotation of the nozzle support 350 sixty degrees in a counterclockwise direction relative to FIG. 25. FIG. 33 is a left end view similar to FIG. 25 illustrating rotation of the nozzle support 350 sixty degrees in a clockwise direction relative to FIG. 25. A rotation of one hundred and twenty degrees for a nozzle support 350 for three nozzles 314A-314C enables one of the three nozzles 314A-314C to be disposed in the direction of movement of the housing 316 as will be described in greater detail hereinafter.

The fluid seal means 330 is shown as a plurality of fluid seal elements 380 including a first and a second fluid seal element 381 and 382 and operates in a manner as described with reference to the first embodiment of the invention. The apparatus includes plural vent means for introducing ambient air into the housing 316 as previously described with reference to the first embodiment of the invention.

FIG. 27 illustrates a plurality of louver panels 410 to create a plurality of vent slots therebetween. The directional or angular relationship of the louver panels 410 enables ambient air to create a vortex of air flow within the peripheral region 368 of the housing internal volume 360 of the housing 316 as previously described.

FIG. 27 illustrates the apparatus 310 includes vacuum connection means 550 including a first and second angularly orientated vacuum port 551-552 disposed proximate the first cylindrical end 361 of the housing 316 adjacent the cylindrical sidewall 364 of the housing internal volume 360 of the housing 316. The vacuum ports 551-552 communicate with input slots 551A-552A defined in the housing sidewall 364 as shown in FIG. 26. The output ports 551B-552B are connected through swivel coupling and through the vacuum hoses 26 to the vacuum source 25 as shown in FIG.

2. The cross-sectional area of the vacuum ports varies along the length thereof to correspond to the total area of the input slot be along the sidewall if the housing. Accordingly, a equal vacuum and an equal flow of fluid will be established along the input slots.

The operation of the apparatus 10 can best be described with reference to FIGS. 22 and 23. When the vacuum source 25 is connected to the vacuum ports 551-552, a partial vacuum is established within the cylindrical housing internal volume 360. The air seal 330 creates a seal between the cylindrical housing internal volume 360 and the surface 320. The vent means introduce ambient air into the cylindrical housing internal volume 360 for creating an air flow from the ambient into the housing 316. The air flow from the ambient into the housing 316 is continuously removed from the cylindrical housing internal volume 360 by the vacuum source 25.

During the operation of the device, the cleaning material 12 is projected from the nozzles 314A-314C onto the surface 20. The orientation of the vent means and the vacuum ports 551 and 552 establish the vortex within the housing internal volume 360 of the housing 316 as shown by the arrows. The vortex is confined to the peripheral region 368 the housing internal volume 360 such that the vortex does not interfere with cleaning material 12 being projected from the plurality of nozzles 314A-314C onto the surface 20. The air flow from the ambient into the housing 316 and more specifically the vortex, collects and removes the impacted cleaning material 12A, the surface material 20A and any contaminants 28 through the vacuum ports 551-552. The impacted cleaning material 12A, surface material 20A and any contaminants 28 are contained within the housing 316 and are removed through the vacuum ports 551 and 552.

Figure 34:
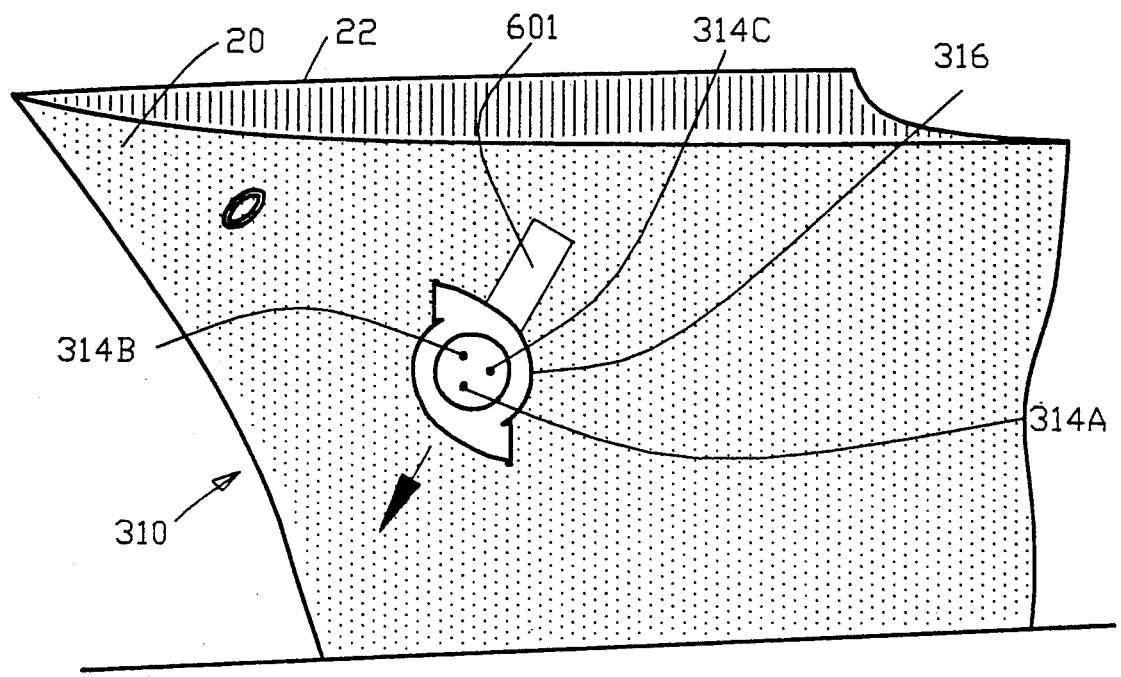
FIG. 34 is an isometric view of the apparatus of FIGS. 24-33 cleaning a ship in a first direction with the nozzles being disposed in an outward position.

FIG. 34 is an isometric view of the apparatus of FIGS. 24-33 cleaning the ship 22 in a first direction. In this example, the nozzle support 350 has been rotated to position the plurality of nozzles 314A-314C such that a lead nozzle 314A leads in the direction of movement of the housing 316 as indicated by the arrow. The trailing nozzles 314B and 314C are aligned substantially perpendicular to the direction of movement of the housing 316 indicated by the arrow. This nozzle position is shown in greater detail in FIG. 32.

FIG. 34 also illustrates the plurality of nozzles 314A-314C being disposed in an outward position as shown more fully in FIGS. 30 and 30A. The movement of the housing 316 in the direction indicated by the arrow results in a first clean area 601 of the surface of the ship.

Figure 35:
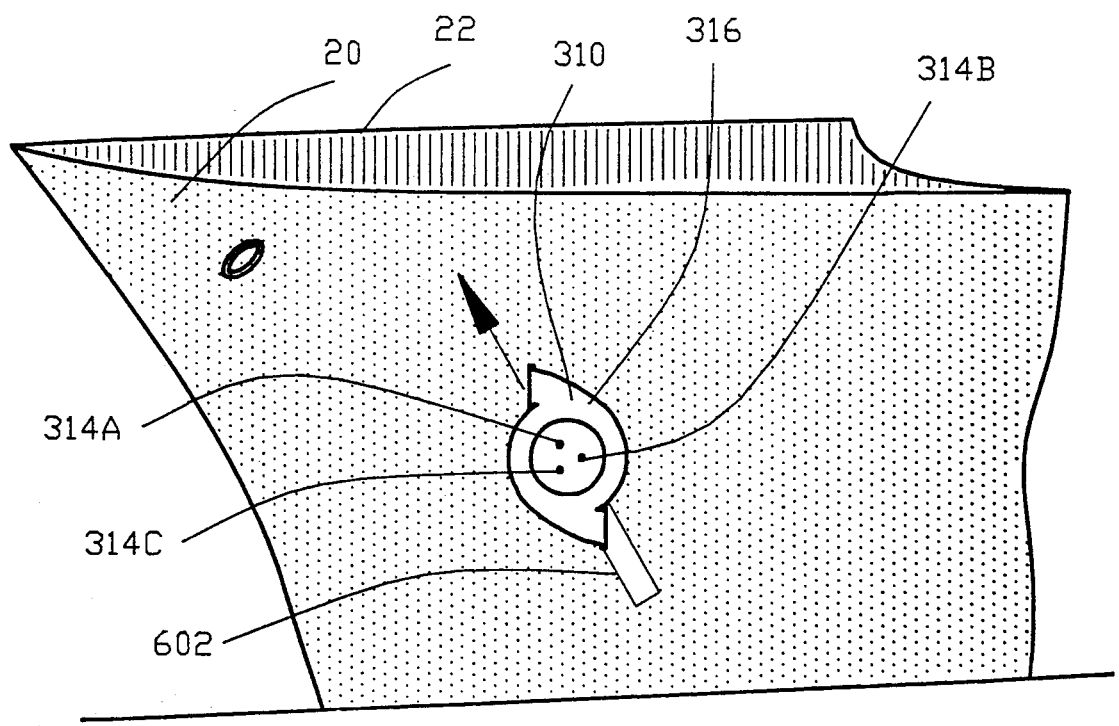
FIG. 35 is an isometric view of the apparatus of FIGS. 24-33 cleaning a ship in a second direction with the nozzles being disposed in an inward position.

FIG. 35 is an isometric view of the apparatus of FIGS. 24-33 cleaning the ship 22 in a second direction. In this example, the nozzle support 350 has been rotated to position the plurality of nozzles 314A-314C such that a lead nozzle 314A leads in the direction of movement of the housing 316 as indicated by the arrow. The trailing nozzles 314B and 314C are aligned substantially perpendicular to the direction of movement of the housing 316 as indicated by the arrow. This nozzle position is shown in greater detailing FIG. 33.

FIG. 34 also illustrates the plurality of nozzles 314A-314C being disposed in an inward position as shown more fully in FIGS. 31 and 31A. The movement of the housing 316 in the direction indicated by the arrow results in a second clean area 601 of the surface of the ship. Since the plurality of nozzles 314A-314C are disposed in the inward position as shown in FIGS. 31 and 31A, the width if the second clean area 602 is narrower that the width of the first clean area 601. However, the cleaning will be more intense due to the higher concentration of the cleaning of the plurality of nozzles 314A-314C disposed in the inward position.

Figure 36:
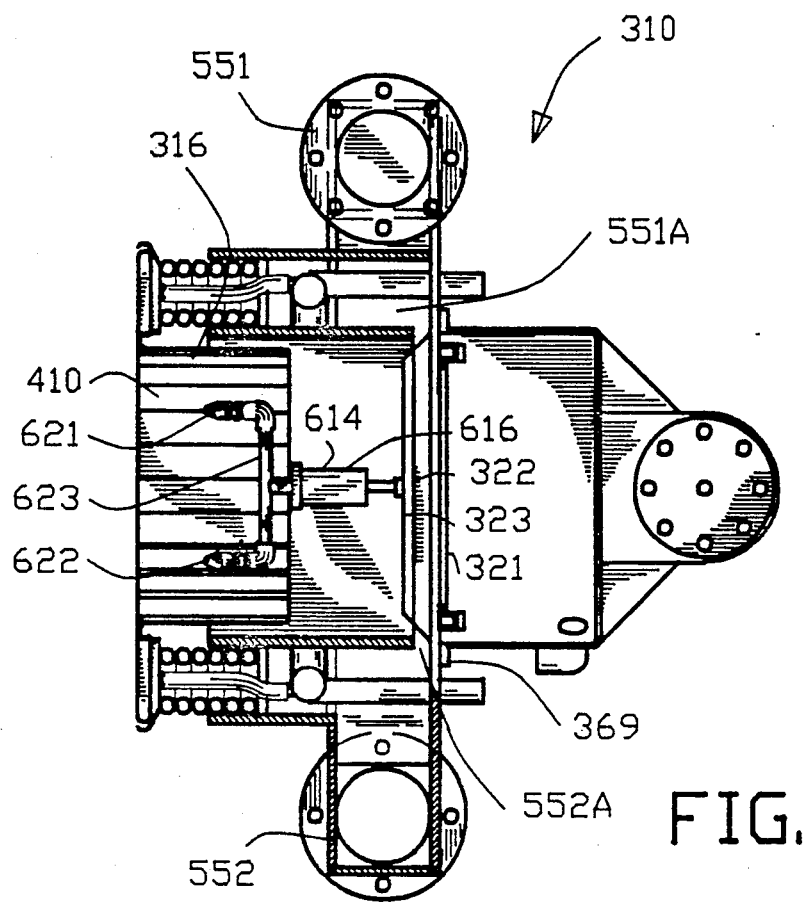
FIG. 36 is a sectional view of a third embodiment of the apparatus of the present invention.
Figure 37:
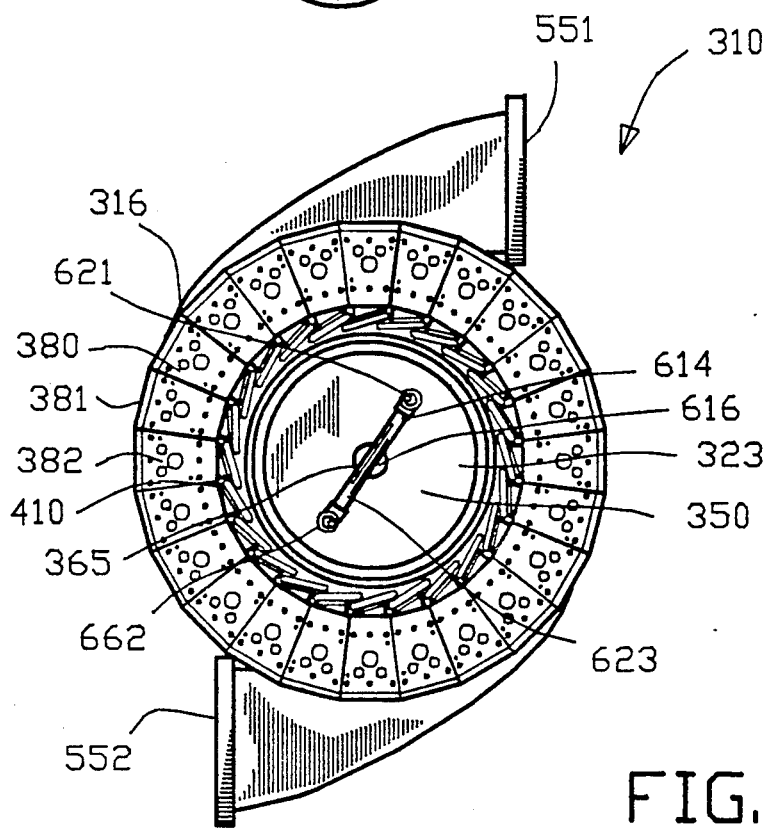
FIG. 37 is a rotated left end view of FIG. 36.

FIG. 36 is a sectional view of a third embodiment of the apparatus of the present invention with FIG. 37 being a rotated left end view of FIG. 36. In this embodiment, the plurality of nozzles 314A-314C have been removed and a rotatable fluid sprayer 614 has been installed within the housing 316. The rotatable fluid sprayer 614 comprises a tubing support 616 extending through the center of the inner and outer disks 321 and 322 and aligned with the cylindrical axis 365 of the cylindrical housing internal volume 360. The tubing support 616 extends through the inner plate 329. A first and a second fluid jet 621 and 622 are located on opposed ends of a rotatable arm 623. The rotatable arm 623 is journalled to the tubing support 616 for rotation about the cylindrical axis 365 of the cylindrical housing internal volume 360. Preferably, the first and second fluid jets 621 and 622 are angled for imparting rotation to the rotatable arm 623 upon discharge of a fluid under pressure from the first and second fluid jets 621 and 622.

The third embodiment of the invention shown in FIGS. 36 and 37 is suitable for use with low pressure cleaning processes such as a water cleaning process or the like. The third embodiment of the invention is also suitable for use in a coating process wherein a protective coating is applied to the surface. The first and second embodiment of the inventions are more suitable for use with high pressure cleaning such as sand blasting and the like. However, it should be appreciated by those skilled in the art that numerous variation in the design of the present invention may be undertaking within the scope of the present invention.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. An apparatus for recovering a cleaning material and a surface material from a surface with a vacuum source, the cleaning material being supplied by a pressurized source of cleaning material, comprising in combination:

a housing having a housing opening;

a plurality of nozzles connected to the pressurized source of cleaning material;

said plurality of nozzles being secured to a nozzle support;

housing mounting means for mounting nozzle support a said housing enabling said plurality of nozzles to project the cleaning material through said housing opening to impact onto the surface to remove the surface material from the surface;

nozzle movement means for moving said plurality of nozzles relative to said housing for varying a projection of the cleaning material from said plurality of nozzles onto the surface;

fluid seal means defining a fluid sealing element;

fluid seal mounting means for mounting said fluid sealing element about said housing opening;

said fluid seal means being connected to a fluid pressure source for discharging a fluid under pressure through said fluid sealing element to provide a seal between said housing opening and the surface; and vacuum connection means for connecting the vacuum source to said housing for withdrawing the impacted cleaning material and the surface material removed from the surface from the housing.

2. A recovery system as set forth in claim 1, wherein said fluid seal means comprises a plurality of fluid sealing elements being disposed about said housing opening; and said fluid seal mounting means independently mounting each of said plurality of fluid sealing elements for enabling each of said plurality of fluid sealing elements to be independently movable for sealing with a curved surface.

3. A recovery system as set forth in claim 1, wherein said fluid seal mounting means includes resilient means for resiliently mounting said fluid sealing element to said housing.

4. A recovery system as set forth in claim 1, wherein said plurality of nozzles support is rotatably mounted within said housing.

5. A recovery system as set forth in claim 1, wherein said nozzle support includes means for varying a spacing between said plurality of nozzles.

6. A recovery system as set forth in claim 1, wherein said nozzle support includes means for varying a spacing between each of said plurality of nozzles and an axial center of said housing.

7. A recovery system as set forth in claim 1, wherein said housing defines a substantially cylindrical housing internal volume having a first and a second cylindrical end and a cylindrical sidewall;

said housing mounting means being disposed proximate said first cylindrical end of said housing for mounting said housing to encompass the plurality of nozzles with the plurality of nozzles being disposed within said housing internal volume of said housing; and said fluid seal mounting means being disposed proximate said second cylindrical end of said housing with said fluid sealing element disposed about said housing opening.

8. A recovery system as set forth in claim 1, wherein said housing defines a substantially cylindrical housing internal volume having a first and a second cylindrical end and a cylindrical sidewall;

said housing mounting means being disposed proximate said first cylindrical end of said housing for mounting said housing to encompass the plurality of nozzles with the plurality of nozzles being disposed within said housing internal volume of said housing; and said vacuum connection means includes a plurality of angularly orientated vacuum ports disposed proximate said first cylindrical end of said housing adjacent said cylindrical sidewall of said substantially cylindrical housing internal volume of said housing.

9. A recovery system as set forth in claim 1, wherein said housing is substantially cylindrical having a first and a second cylindrical end and a cylindrical sidewall;

said housing mounting means comprising first resilient means resiliently mounting said housing proximate said first cylindrical end of said housing; and said fluid seal mounting means comprising second resilient means resiliently mounting said fluid seal means proximate said second cylindrical end of said housing with said fluid sealing element disposed about said housing opening.

10. A recovery system as set forth in claim 1, wherein said housing defines a substantially cylindrical housing internal volume having a first and a second cylindrical end and a cylindrical sidewall;

said housing mounting means being disposed proximate said first cylindrical end of said housing for mounting said housing to encompass the plurality of nozzles with the plurality of nozzles being disposed within a central region of said housing internal volume of said housing;

said fluid seal mounting means being disposed proximate said second cylindrical end of said housing with said fluid sealing element disposed about said housing opening; and said vacuum connection means being disposed proximate said first cylindrical end of said housing within a peripheral region of said housing internal volume of said housing.

11. A recovery system as set forth in claim 1, including vent means for introducing ambient air into the housing for enabling the vacuum source to withdraw impacted cleaning material and the surface material from the housing.

12. A recovery system as set forth in claim 1, wherein said housing defines a substantially cylindrical housing internal volume having a first and a second cylindrical end and a cylindrical sidewall; and vent means disposed in said cylindrical sidewall for introducing ambient air into the housing for creating an air flow from the ambient into the housing for enabling the vacuum source to withdraw impacted cleaning material and the surface material from the housing.

13. A recovery system as set forth in claim 1, wherein said housing defines a substantially cylindrical housing internal volume;

said housing mounting means mounting said housing to encompass the plurality of nozzles with the plurality of nozzles being disposed within a central region of said housing internal volume of said housing; and vent means for creating a vortex within a peripheral region of said housing internal volume of said housing for withdrawing the impacted cleaning material and the surface material from the housing.

* * * * *

UNITED STATES PATENT AND TRADEMARK OFFICE
CERTIFICATE OF CORRECTION

PATENT NO. : 5,319,893
DATED : June 14, 1994
INVENTOR(S) : Wayne B. Hockett

It is certified that error appears in the above-identified patent and that said Letters Patent is hereby corrected as shown below:

Column 4, line 49, delete "21" and insert therefor --22--.

In the Claims

Claim 1, column 16, line 60, delete "a" and insert therefor --to--.

Signed and Sealed this

Sixth Day of September, 1994

Attest:

BRUCE LEHMAN

Attesting Officer

Commissioner of Patents and Trademarks